(12) United States Patent
Nakamura et al.

(10) Patent No.: US 11,178,384 B2
(45) Date of Patent: Nov. 16, 2021

(54) INFORMATION PROCESSING SYSTEM, STORAGE MEDIUM, INFORMATION PROCESSING APPARATUS AND INFORMATION PROCESSING METHOD

(71) Applicant: NINTENDO CO., LTD., Kyoto (JP)

(72) Inventors: Yuki Nakamura, Kyoto (JP); Kiyoshi Takeuchi, Kyoto (JP); Mizuki Tatsuno, Kyoto (JP); Jonathan Johnson, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/507,169

(22) Filed: Jul. 10, 2019

(65) Prior Publication Data
US 2021/0014471 A1 Jan. 14, 2021

(51) Int. Cl.
*H04N 13/279* (2018.01)
*H04N 13/239* (2018.01)
*H04N 13/282* (2018.01)
*H04N 13/344* (2018.01)

(52) U.S. Cl.
CPC ......... *H04N 13/279* (2018.05); *H04N 13/239* (2018.05); *H04N 13/282* (2018.05); *H04N 13/344* (2018.05)

(58) Field of Classification Search
CPC .. H04N 13/279; H04N 13/344; H04N 13/239; H04N 13/282
See application file for complete search history.

(56) References Cited

U.S. PATENT DOCUMENTS

| | | | | |
|---|---|---|---|---|
| 2015/0352437 | A1* | 12/2015 | Koseki | G06F 3/011 463/31 |
| 2016/0357017 | A1* | 12/2016 | Nishidate | G02B 27/0093 |
| 2017/0180721 | A1* | 6/2017 | Parker | H04N 13/341 |
| 2018/0330521 | A1* | 11/2018 | Samples | F21V 23/0471 |
| 2019/0011981 | A1* | 1/2019 | Noguchi | G06F 3/017 |
| 2019/0026071 | A1* | 1/2019 | Tamaoki | A63F 13/52 |
| 2020/0356233 | A1* | 11/2020 | Boesel | G06F 3/04815 |

FOREIGN PATENT DOCUMENTS

JP 2019-076635 5/2019
WO WO 2019/041171 A1 * 3/2019 ........... G06F 3/0484

* cited by examiner

*Primary Examiner* — Mohammed S Rahaman
(74) *Attorney, Agent, or Firm* — Nixon & Vanderhye, P.C.

(57) ABSTRACT

A game system that is a non-limiting example information processing system is attached to a goggle device, and generates and displays a left-eye image and a right-eye image on a display. When starting a game application that a plurality of individual games can be selectively played, a menu image is displayed on the display. A plurality of icons each relating to each of the plurality of individual games are arranged at predetermined positions in a virtual space for displaying the menu image. A virtual camera arranged at a predetermined position in the virtual space changes a posture thereof so as to correspond to a posture change of a main body apparatus in a real space, thereby to control a direction of a line-of-sight of the virtual camera. If an icon is included in a field of view of the virtual camera when a user depresses a predetermined button, predetermined processing relevant to the icon is performed.

14 Claims, 22 Drawing Sheets

FIG. 13
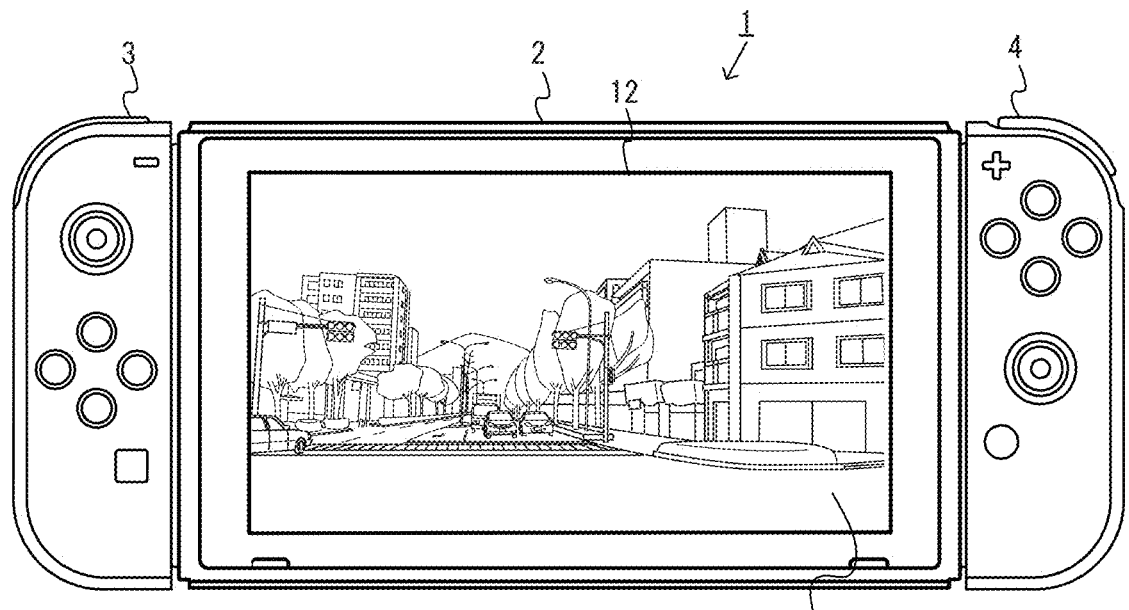
NON-STEREOSCOPIC DISPLAY MODE
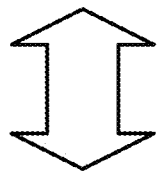
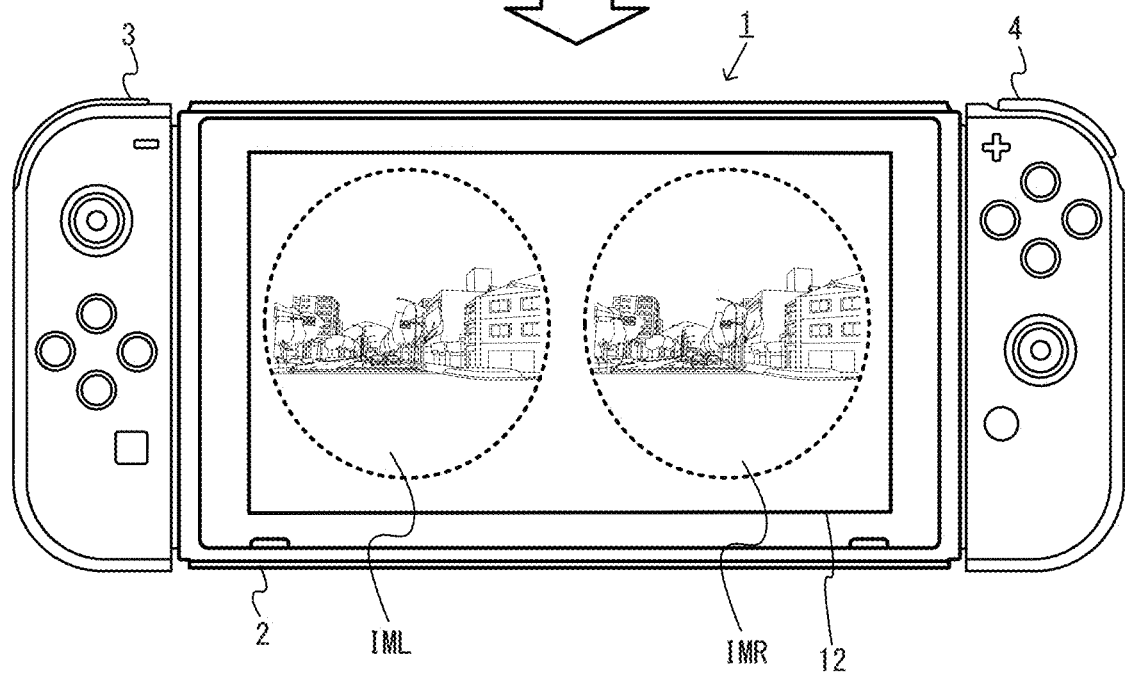
STEREOSCOPIC DISPLAY MODE

INFORMATION PROCESSING SYSTEM, STORAGE MEDIUM, INFORMATION PROCESSING APPARATUS AND INFORMATION PROCESSING METHOD

FIELD

This application explains an information processing system, storage medium, information processing apparatus and information processing method, in which an object arranged in a virtual space can be operated.

SUMMARY

It is a primary object of an embodiment(s) is to provide a novel information processing system, storage medium, information processing apparatus and information processing method.

It is another object of the embodiment(s) to provide an information processing system, storage medium, information processing apparatus and information processing method, capable of preventing processing that is unintended by a user from being performed.

A first embodiment is an information processing system comprising a goggle device including an inertia sensor and a display, an operation portion, and one or more processors, wherein the one or more processors execute: acquiring movement data based on an output of the inertia sensor and operation data to the operation portion; controlling a posture of a virtual camera in a virtual space based on the movement data; performing, if at least a part of a predetermined object in the virtual space is included in a field of view of the virtual camera when there is a predetermined operation input, predetermined processing relevant to the predetermined object according to the predetermined operation input; and generating an image based on the virtual camera to be displayed on the display.

According to the first embodiment, since if at least a part of the predetermined object in the virtual space is included in the field of view of the virtual camera when there is the predetermined operation input, the predetermined processing relevant to the predetermined object according to the predetermined operation input is performed, it is possible to prevent processing that is unintended by a user from being performed.

A second embodiment is the information processing system according to the first embodiment, wherein the one or more processors further execute determining whether at least a part of the predetermined object is included in the field of view of the virtual camera.

A third embodiment is the information processing system according to the first embodiment, wherein the one or more processors further execute displaying an image of an operation portion that is for performing the predetermined operation input if at least a part of the predetermined object is included in the field of view of the virtual camera.

According to the third embodiment, since the image of the operation portion that is for performing the predetermined operation input is displayed if at least a part of the predetermined object is included in the field of view of the virtual camera, it is possible for the user to easily know that the predetermined processing relating to the predetermined object is performable and that the predetermined object is operable.

A fourth embodiment is the information processing system according to the first embodiment, wherein the one or more processors execute processing of transitioning to a scene related to the predetermined object as the predetermined processing.

A fifth embodiment is the information processing system according to the first embodiment, wherein the predetermined object including a plurality of objects, and the one or more processors further execute specifying one object out of the plurality of objects if at least a part of the predetermined object in the virtual space is included in the field of view of the virtual camera when an operation input for changing a operation target, and performing processing relevant to the specified object as the predetermined processing.

A sixth embodiment is the information processing system according to the first embodiment, wherein the one or more processors further execute controlling the posture of the virtual camera in the virtual space based on a posture of the goggle device.

According to the sixth embodiment, it is possible to control the posture of the virtual camera based on a posture of a head of the user that attaches with the goggle device.

A seventh embodiment is the information processing system according to the sixth embodiment, wherein the virtual camera is located at a first specific position in the virtual space.

An eighth embodiment is the information processing system according to the sixth embodiment, wherein the predetermined object is located at a second specific position in the virtual space.

A ninth embodiment is the information processing system according to the sixth embodiment, wherein the one or more processors further execute changing a direction in a horizontal direction of the virtual camera to a reference direction when there is a further predetermined operation input different from the predetermined operation input.

A tenth embodiment is the information processing system according to the first embodiment, wherein the object is a character object, and the one or more processors perform processing relating to control of the character object as the predetermined processing.

According to the tenth embodiment, the character object within the field of view is controlled, and therefore, in such a case, it is possible to prevent processing that is unintended by the user from being performed.

An eleventh embodiment is the information processing system according to the first embodiment, wherein the one or more processors execute generating a stereoscopic image based on the virtual camera.

A twelfth embodiment is a non-transitory computer-readable storage medium having stored therein an information processing program executable by one or more processors of an information processing apparatus, wherein the information processing program causes the one or more processors to execute: acquiring movement data based on an output of the inertia sensor provided in a goggle device and operation data to an operation portion; controlling a posture of a virtual camera in a virtual space based on the movement data; performing, if at least a part of a predetermined object in the virtual space is included in a field of view of the virtual camera when there is a predetermined operation input, predetermined processing relevant to the predetermined object according to the predetermined operation input; and generating an image based on the virtual camera to be displayed on the display.

A thirteenth embodiment is an information processing apparatus, comprising, one or more processors, wherein the one or more processors execute: acquiring movement data based on an output of the inertia sensor provided in a goggle device and operation data to an operation portion; controlling a posture of a virtual camera in a virtual space based on the movement data; performing, if at least a part of a predetermined object in the virtual space is included in a field of view of the virtual camera when there is a predetermined operation input, predetermined processing relevant to the predetermined object according to the predetermined operation input; and generating an image based on the virtual camera to be displayed on the display.

A fourteenth embodiment is an information processing method, comprising: acquiring movement data based on an output of the inertia sensor provided in a goggle device and operation data to an operation portion; controlling a posture of a virtual camera in a virtual space based on the movement data; performing, if at least a part of a predetermined object in the virtual space is included in a field of view of the virtual camera when there is a predetermined operation input, predetermined processing relevant to the predetermined object according to the predetermined operation input; and generating an image based on the virtual camera to be displayed on the display.

According to each of the twelfth to fourteenth embodiments, like the first embodiment, it is possible to prevent processing that is unintended by the user from being performed.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 13 is an illustration view showing non-limiting example images displayed on a display of the main body apparatus in a stereoscopic display mode and a non-stereoscopic display mode, respectively.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
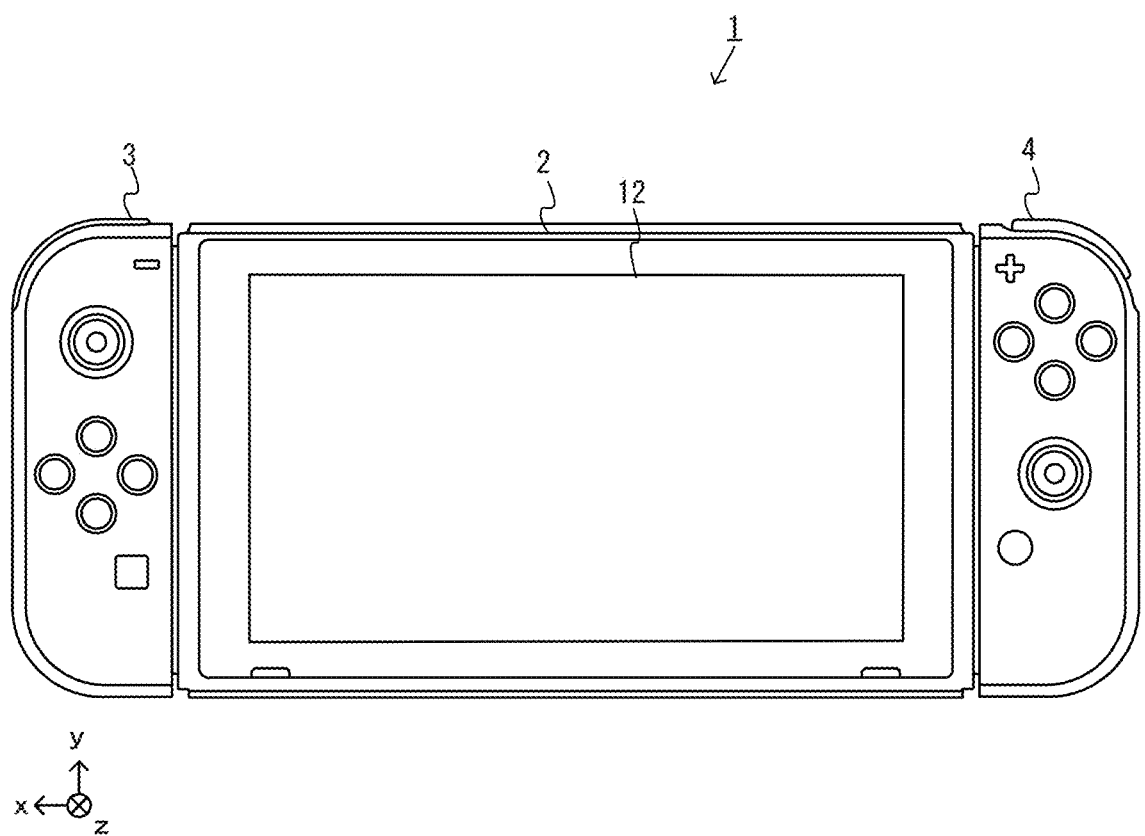
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
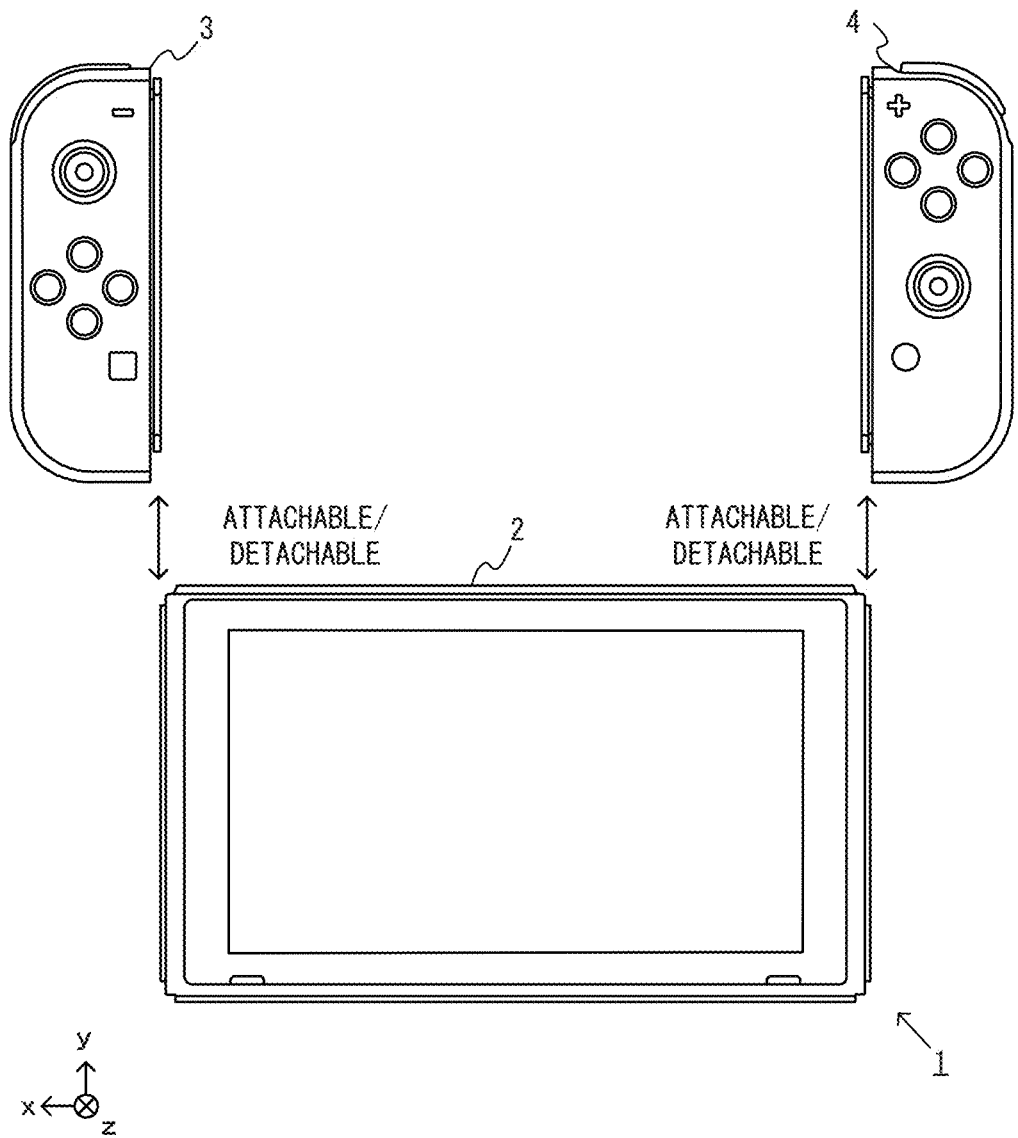
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
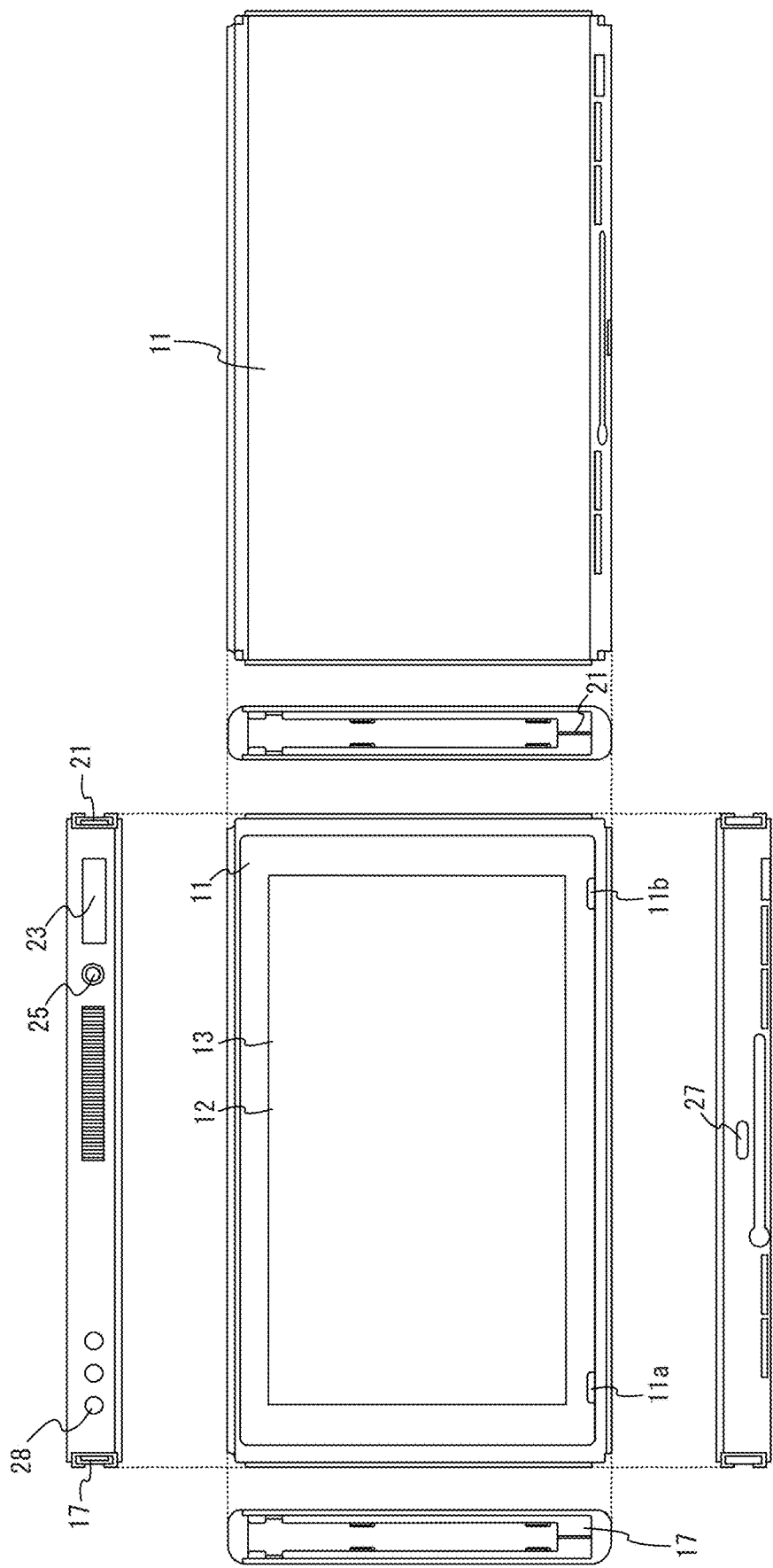
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, i.e., a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display. Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
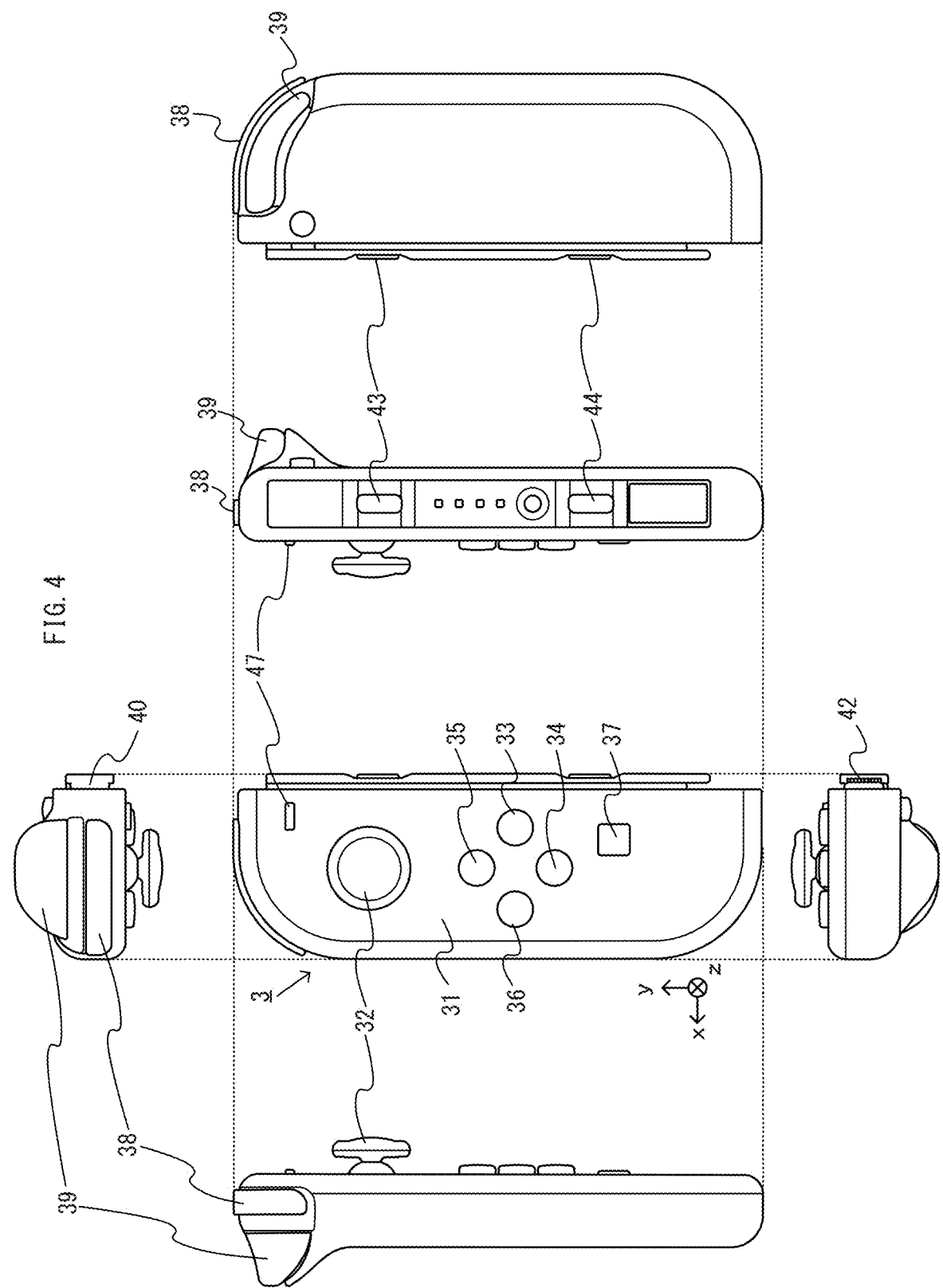
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, i.e., is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
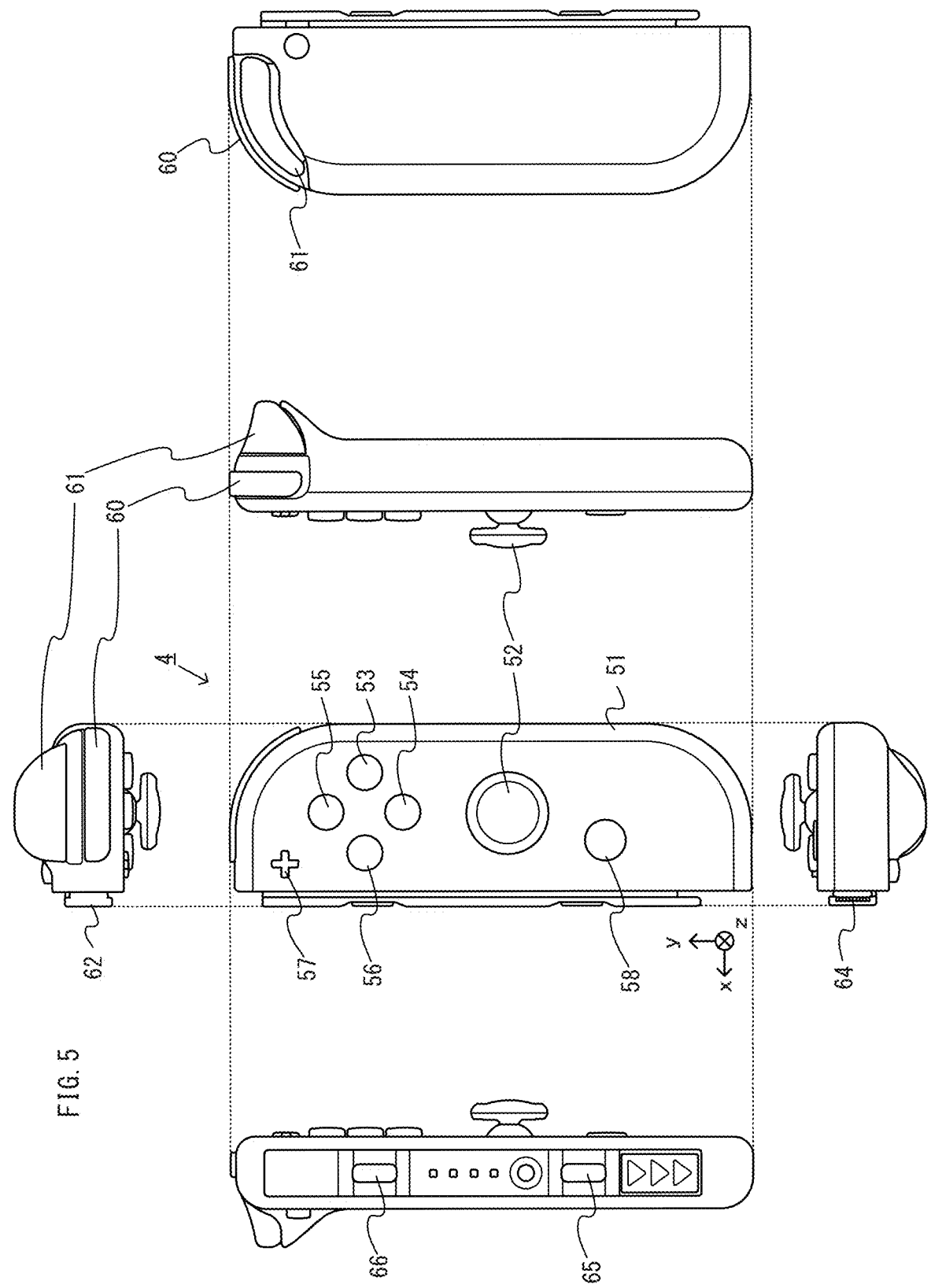
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, i.e., a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
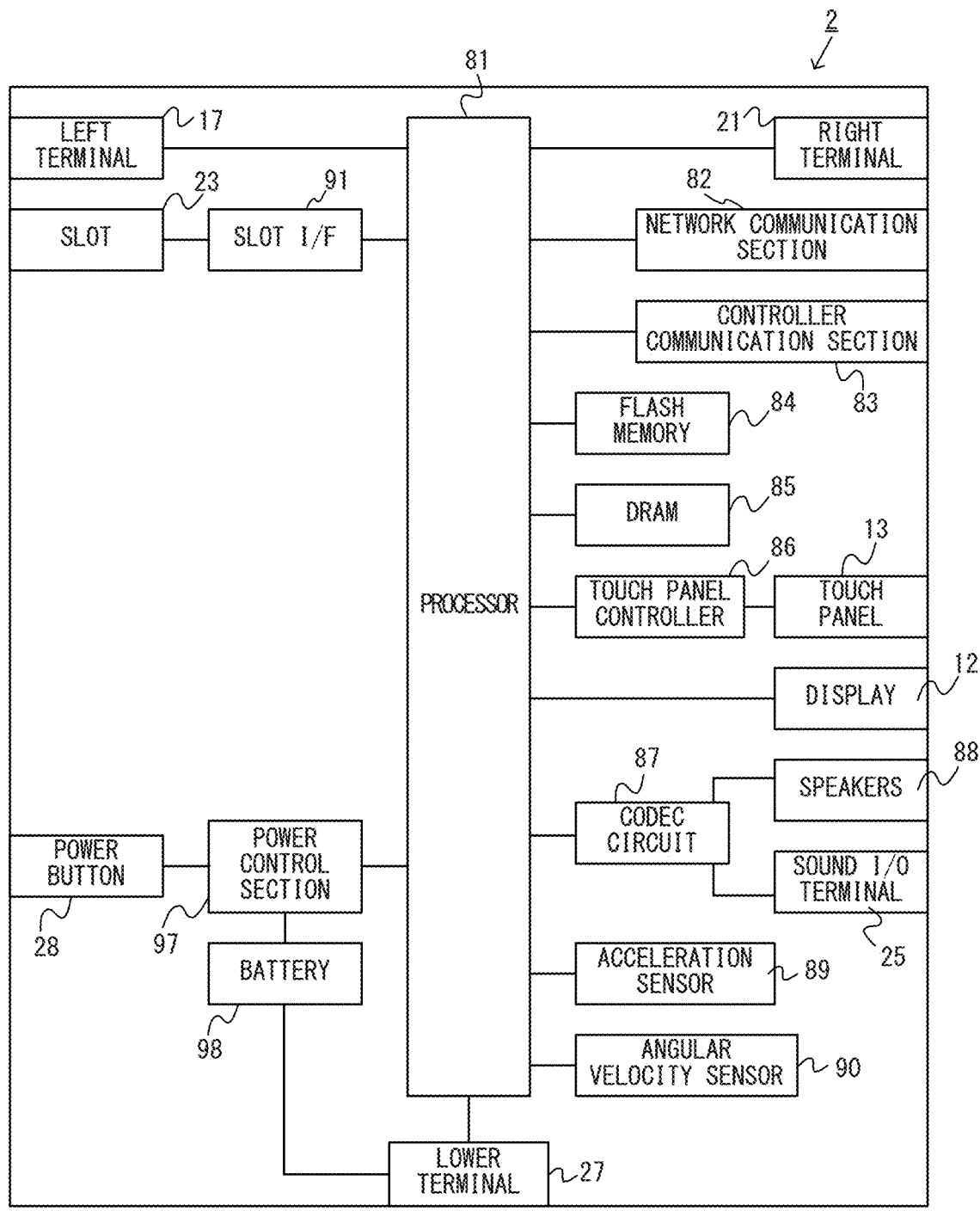
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data. The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

Moreover, the main body apparatus 2 comprises an acceleration sensor 89. In this embodiment, the acceleration sensor 89 detects magnitudes of accelerations along predetermined three (3) axial (e.g., x, y and z axes shown in FIG. 1) directions. In addition, that the acceleration sensor 89 may detect an acceleration along one (1) axial direction or accelerations along two (2) axial directions.

Moreover, the main body apparatus 2 comprises an angular velocity sensor 90. In this embodiment, the angular velocity sensor 90 detects angular velocities around predetermined three (3) axes (e.g., the x, y and z axes shown in FIG. 1). In addition, the angular velocity sensor 90 may detect an angular velocity around one (1) axis or angular velocities around two (2) axes.

The acceleration sensor 89 and the angular velocity sensor 90 are connected to the processor 81, and detection results of the acceleration sensor 89 and the angular velocity sensor 90 are output to the processor 81. Based on the detection results of the acceleration sensor 89 and the angular velocity sensor 90, the processor 81 can calculate information regarding a motion and/or a posture of the main body apparatus 2.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
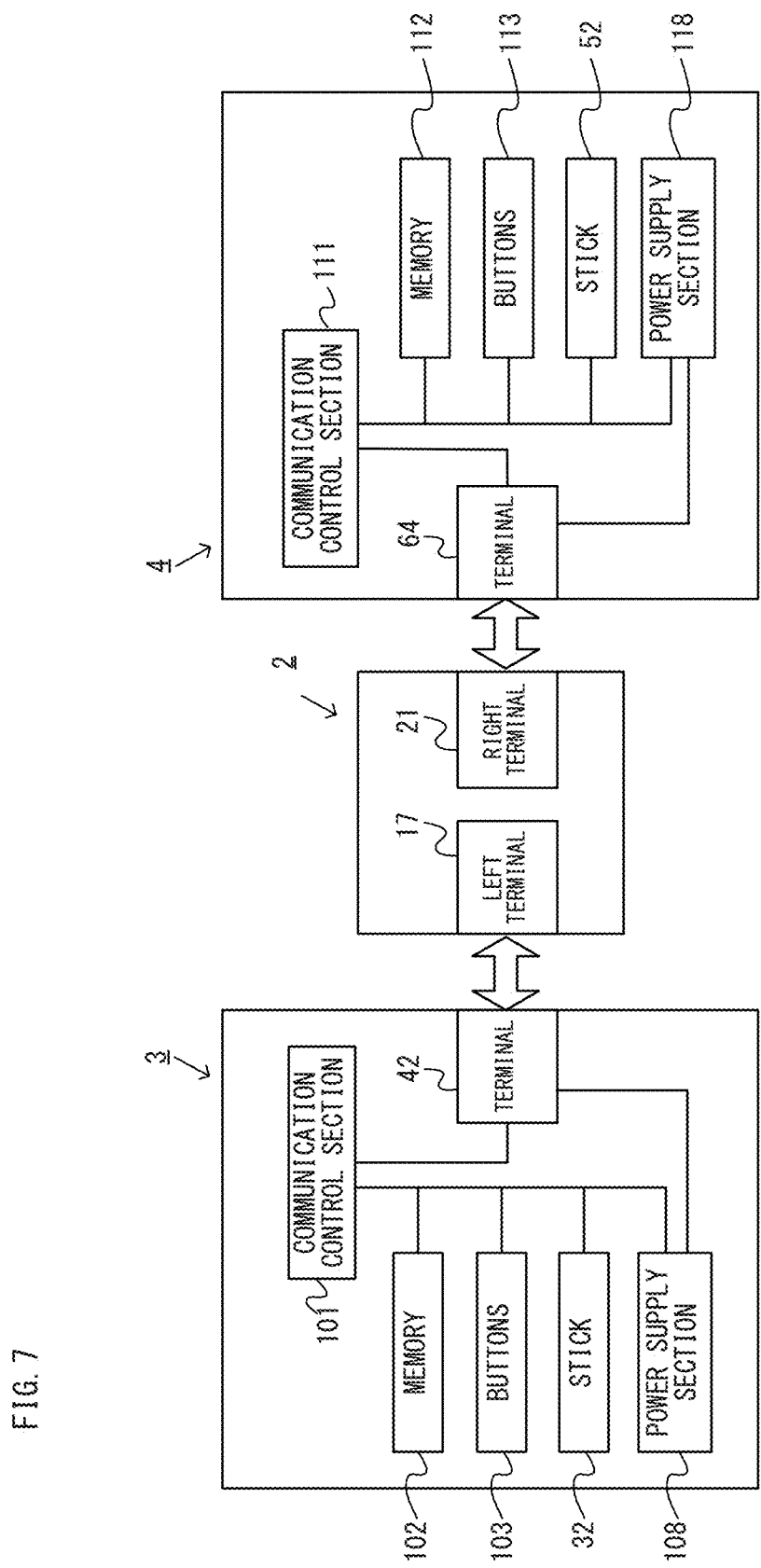
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example. Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
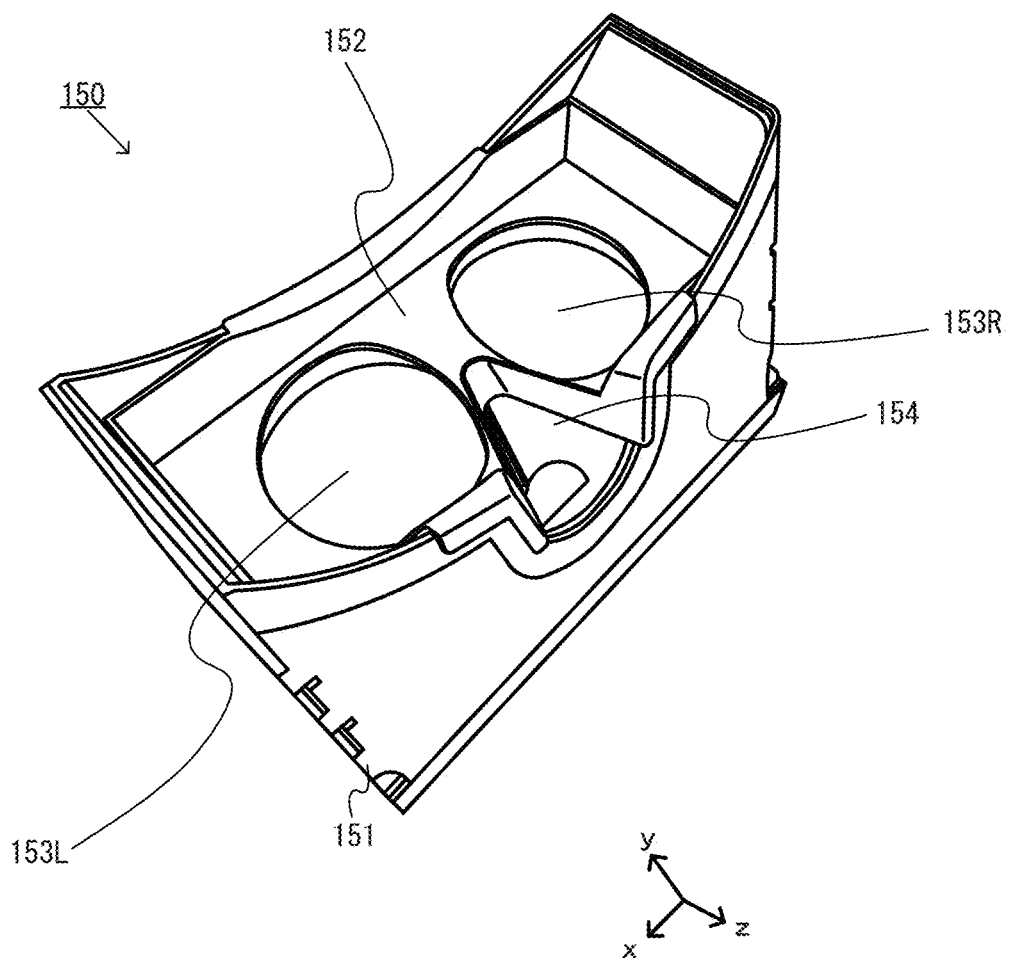
FIG. 8 is a perspective view showing a non-limiting example appearance of a goggle device.
Figure 9:
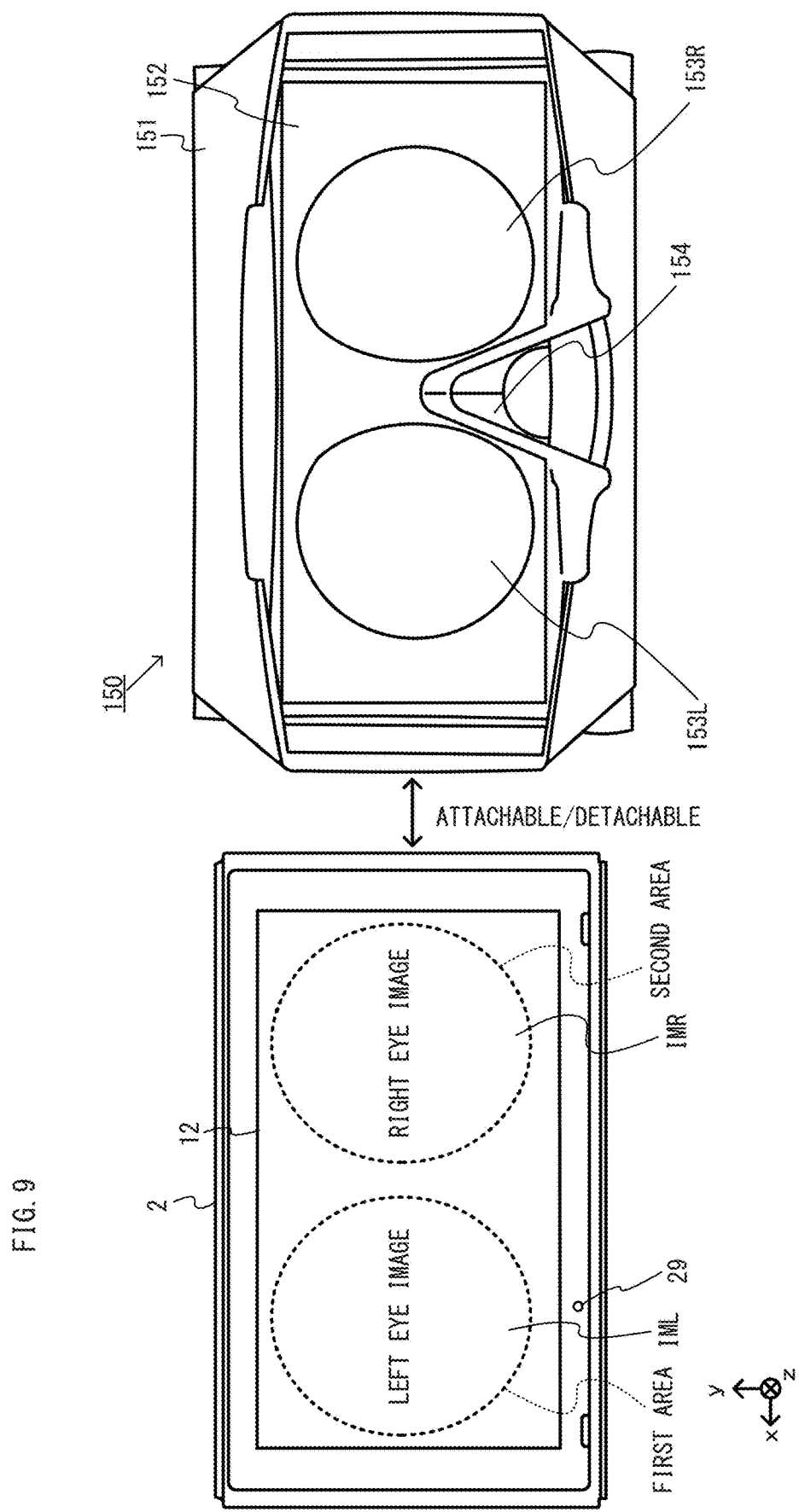
FIG. 9 is a front view showing a non-limiting example state where the main body apparatus is attached to the goggle device.
Figure 10:
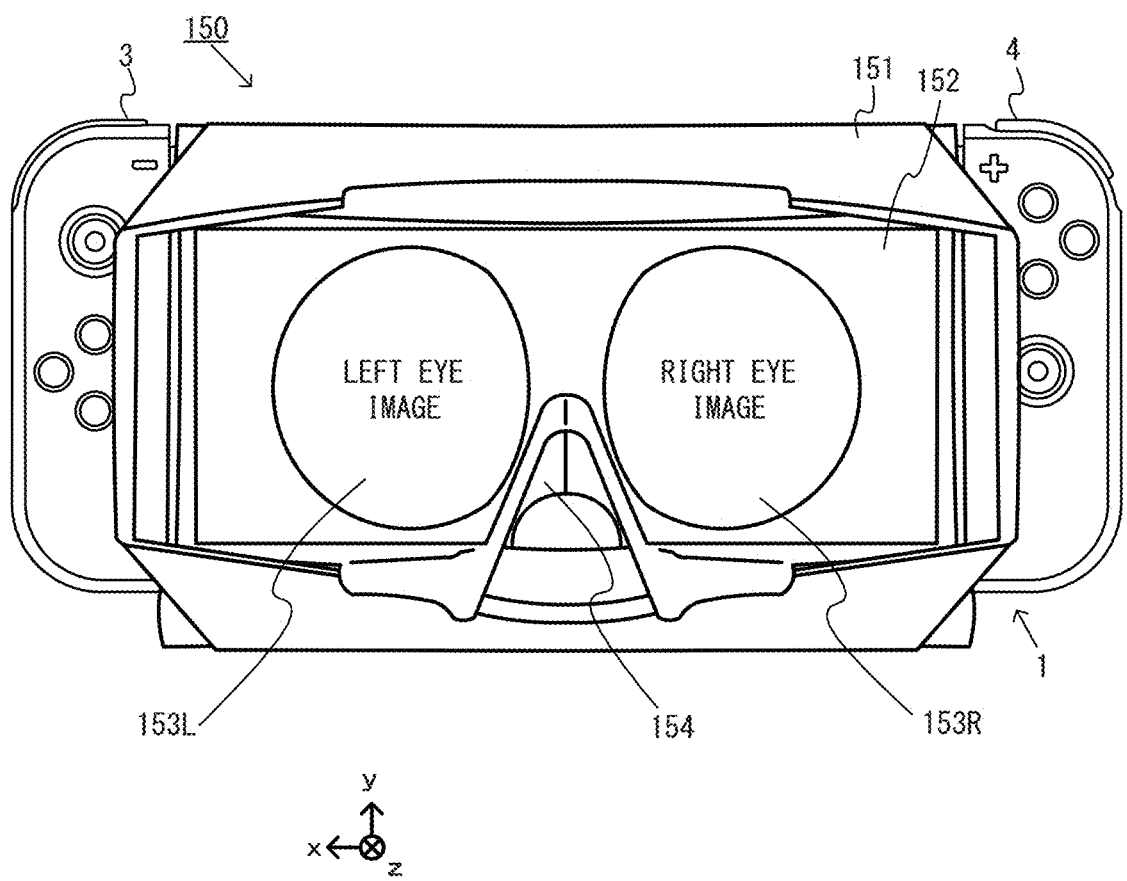
FIG. 10 is a front view showing a non-limiting example state where a game system is attached to the goggle device.
Figure 11:
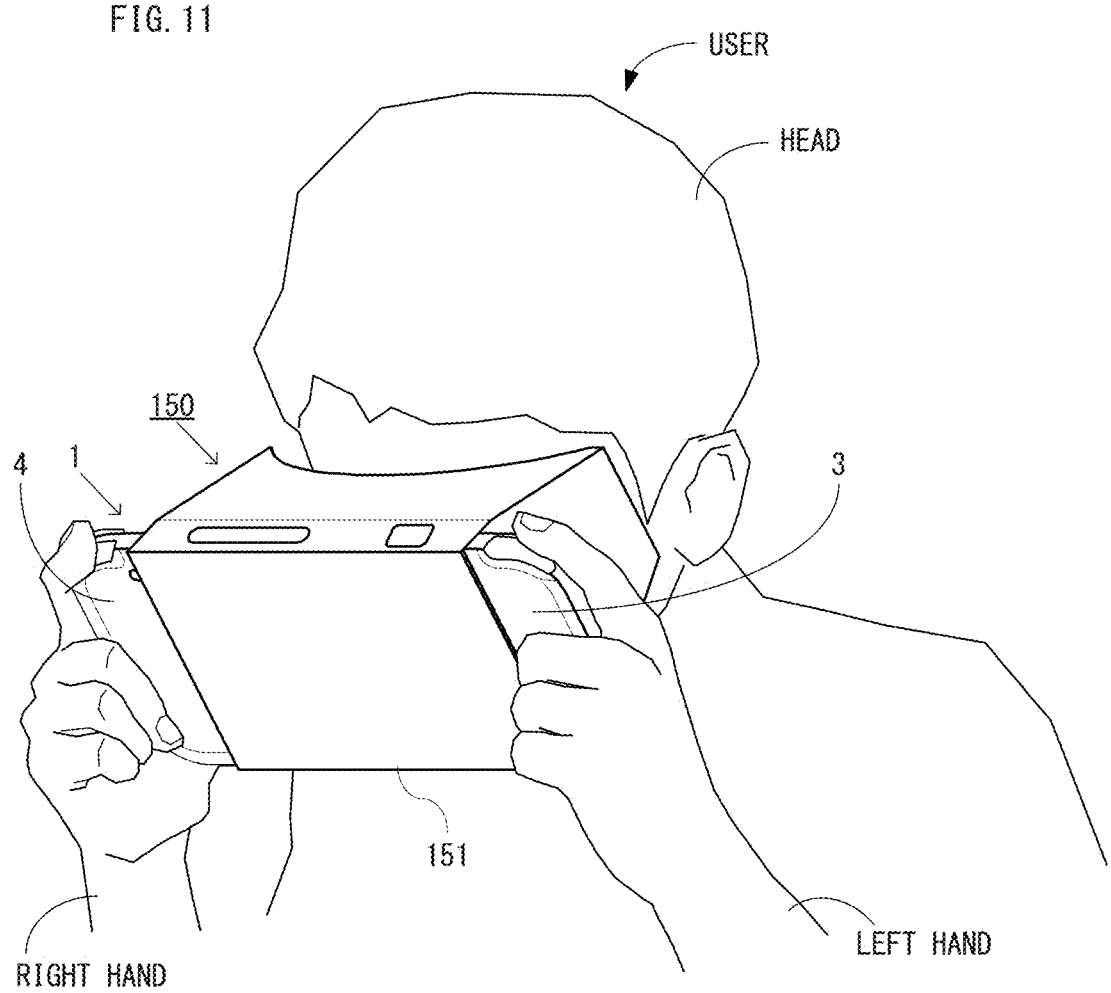
FIG. 11 is an illustration view showing a non-limiting example state where the game system attached to the goggle device is held.
Figure 12:
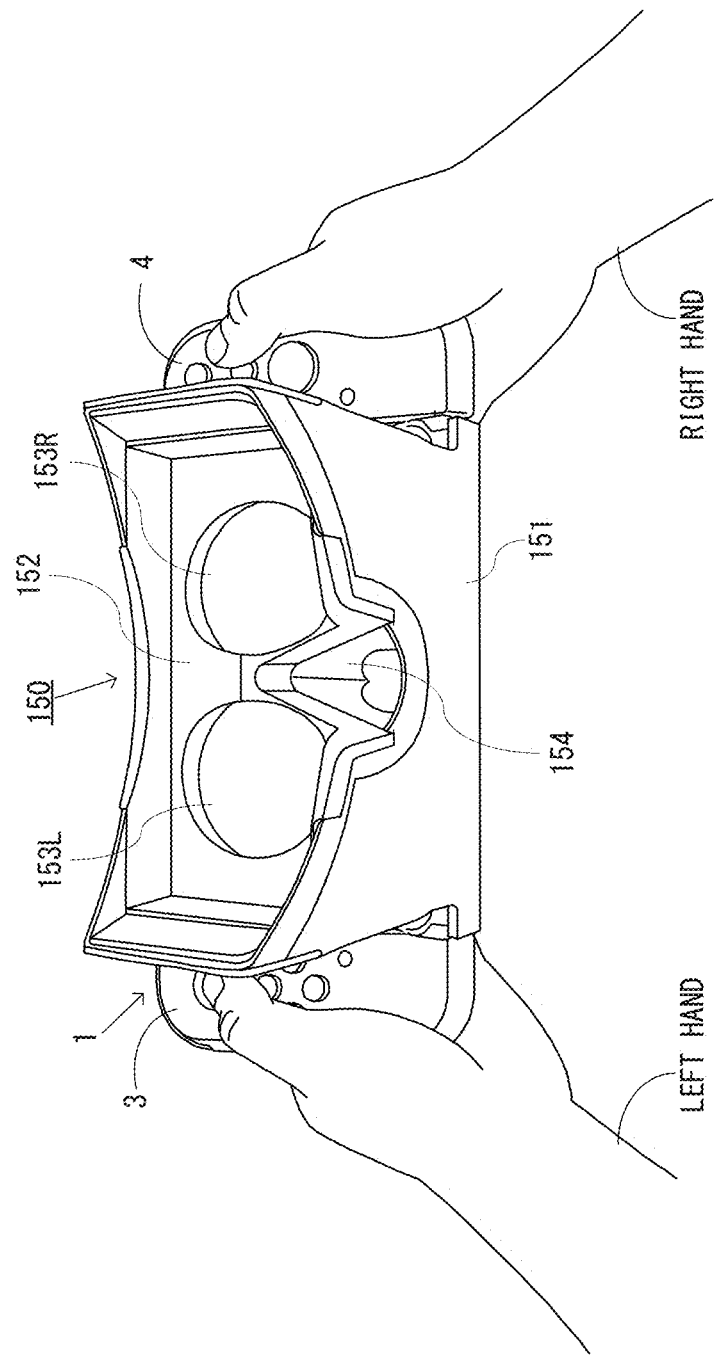
FIG. 12 is an illustration view showing a non-limiting example manner that the goggle device attached with the game system is used.

Next, with reference to FIG. 8-FIG. 12, a goggle device 150 attachable with the game system 1 and the goggle device 150 attached with the game system 1 will be described. FIG. 8 is a perspective view showing a non-limiting example appearance of the goggle device 150. FIG. 9 is a front view showing a non-limiting example state where the main body apparatus 2 is attached to the goggle device 150. FIG. 10 is a front view showing a non-limiting example state where the goggle device 150 attached with the game system 1. FIG. 11 is an illustration view showing a non-limiting example state where the game system 1 attached to the goggle device 150 is held. FIG. 12 is an illustration view showing a non-limiting example manner that the goggle device 150 attached with the game system 1 is used.

As shown in FIG. 8-FIG. 10, the goggle device 150 has a main body 151, a lens frame member 152, lenses 153 and a plate-like member 154. However, the goggle device 150 may not be limited to a configuration described later as long as that is a device wearable to fit to the face of the user so as to cover the left-eye and the right-eye of the user, and having a function of blocking at least a part of external light and a function of supporting a stereoscopic vision by the user through a pair of lenses. For example, the goggle device 150 may be a device that is used in various states, such as a type to be fit to the face of the user by being held by the user (hand-held type goggle), a type to be fit to the face of the user by being fixed on the head of the user, a type that the user looks into in the mounted state thereof. Moreover, the goggle device 150 may be a device that functions as a so-called head mounted display by being worn on the head of the user in a state where the game system 1 (or the main body apparatus 2) is attached thereto, or may be a device having a helmet-type shape other than a goggle type. In the following description on the goggle device 150, a hand-held type goggle device that is worn to be fit to the face of the user by being held by the user will be described.

The main body 151 has an attachment portion for attachably and detachably fixing the main body apparatus 2. As shown in FIG. 9 and FIG. 11, the main body apparatus 2 is attached to the goggle device 150 by sliding and inserting the main body apparatus 2 into an air gap of the attachment portion of the main body 151. Moreover, the main body apparatus 2 can be detached from the goggle device 150 by sliding the main body apparatus 2 left or right from a state of being attached to the goggle device 150. Thus, the goggle device 150 can be attached with the main body apparatus 2 attachably and detachably.

In addition, when attaching or detaching the game system 1 to or from the goggle device 150, the left controller 3 or the right controller 4 is detached from the main body apparatus 2. However, as shown in FIG. 9, the left controller 3 and the right controller 4 both may be detached from the main body apparatus 2.

The lens frame member 152 is fixedly provided on a side of the above-described opening formed in the front portion of the main body 151. The lens frame member 152 has a pair of lens frames that are opened so as not to obstruct a visibility of each of the display images (a left-eye image IML and a right-eye image IMR) displayed on the display 12 of the main body apparatus 2 attached to the main body 151. Moreover, a joining plane for being joined to the main body apparatus 2 is formed on an outer edge that is formed upper, lower, left and right parts of the lens frame member 152, and a V-letter-shaped concave portion for being brought into contact with the nose of the user that wears the goggles device 150 is formed in the central portion of the outer edge formed in the lower part.

Lenses 153 that are examples of a first lens and a second lens that constitute an image display system are constituted by a pair of left-eye lens 153L and right-eye lens 153R, which are a pair of Fresnel lenses, for example. The left-eye lens 153L and right-eye lens 153R are fit into the lens frames of the lens frame member 152, respectively.

In addition, the left-eye lens 153L and the right-eye lens 153R each may typically be circular or elliptical magnifying lenses, or may be a lens that distorts an image and allows the user to visually recognize the image. For example, it may be a device that an image can stereoscopically viewed by distorting the left-eye image IML (described later) being distorted and displayed in a circular or elliptic shape in a direction opposite to a direction of the distortion of the left-eye image IML to be visually recognized by the left-eye lens 153L and by distorting the right-eye image IMR (described later) being distorted and displayed in a circular or elliptic shape in a direction opposite to a direction of the distortion of the right-eye image IMR to be visually recognized by the right-eye lens 153R. Moreover, the left-eye lens 153L and the right-eye lens 153R may be structure that the both are integrally formed.

As shown in FIG. 10, the plate-like member 154 is fixedly provided an inside of the body 151 between the lens frame member 152 and the display 12 when the main body apparatus 2 is attached to the attachment portion of the main body 151. For example, the plate-like member 154 has a shape that a part thereof follows the V-letter-shaped concave portion in the lens frame member 152, and is arranged like a wall that connects the concave portion and the display 12 of the main body apparatus 2 being attached. This concave portion is formed in a position that becomes a lower portion of the middle point between the left-eye lens 153L and the right eye lens 153R, and contacts the nose of the user who views at the stereoscopic image displayed on the display 12.

When the game system 1 is attached to the goggles device 150, the user can view only the left-eye image IML displayed in a left side area through the left-eye lens 153L, and can view only the right-eye image IMR displayed in a right side area through the right-eye lens 153R. Therefore, it becomes possible for the user who uses the game system 1 attached to the goggle device 150 to see the left-eye image IML by viewing the left-eye lens 153L by the left-eye and the right-eye image IMR by viewing the right-eye lens 153R by the right-eye, so that it is possible to display for the user a stereoscopic image having stereoscopic feeling by displaying the left-eye image IML and the right-eye image IMR having parallax.

As shown in FIG. 11 and FIG. 12, when the user views the stereoscopic image displayed on the display 12 using the game system 1 attached to the goggle device 150, in this embodiment, the left controller 3 can be held with the left hand, and the right controller 4 can be held with the right hand. Therefore, the user can performs an operation using the left controller 3 and the right controller 4 while viewing the stereoscopic image.

Moreover, the game system 1 can calculate, based on detection results of the acceleration sensor 89 and/or the angular velocity sensor 90 provided in the main body apparatus 2, information concerning a motion and/or posture of the game system 1 (or the main body apparatus 2), i.e., a motion and/or posture of the goggle device 150 attached with the game system 1. Therefore, the game system 1 can calculate a posture of the gravity direction basis of the head of the user looking into the goggle device 150 attached with the game system 1. Moreover, the game system 1 becomes possible to calculate, when the posture or direction of the head of the user who looks into the goggle device 150 attached with the game system 1 is changed, the changed direction or angle. Therefore, when the user views the stereoscopic image displayed on the display 12 through the left-eye lens 153L and the right-eye lens 153R in a state where the game system 1 is attached to the goggle device 150, it becomes possible for the user to implement a play style capable of performing of an operation based on the posture of the gravity direction basis of the goggle device 150 attached with the game system 1, and an operation changing the posture of the goggle device 150 attached with the game system 1.

In addition, it is possible to perform an operation while removing at least one of the left controller 3 and the right controller 4 from the main body apparatus 2. When performing an operation by using the right controller 4, for example, the user views the stereoscopic image displayed on the display 12 while holding by the left hand the goggles device 150 (or the left controller 3) attached with the main body apparatus 2, and holds the removed right controller 4 and performs an operation on the removed right controller 4 alone. In this case, the operation information obtained through the operation to the left controller 3 and/or the right controller 4 having been removed from the main body apparatus 2 is transmitted to the main body apparatus 2 by the wireless communication with the main body apparatus 2. Specifically, the operation information obtained through the operation to the left controller 3 is wirelessly transmitted from the communication control unit 101 of the left controller 3, and received by the controller communication unit 83 of the main body apparatus 2. Furthermore, the operation information obtained through the operation to the right controller 4 is wirelessly transmitted from the communication control unit 111 of the right controller 4, and received by the controller communication unit 83 of the main body apparatus 2.

Moreover, if the main body apparatus 2, the left controller 3 or the right controller 4 is provided with a vibrator, it becomes possible for the game system 1 to detect vibration if the user who looks into the goggle device 150 attached with the game system 1 applies vibration like striking of the goggle device 150 attached with the game system 1. Therefore, when the user viewing the stereoscopic image displayed on the display 12 through the left-eye lens 153L and the right-eye lens 153R in a state where the game system 1 is attached to the goggle device 150, it becomes possible for the user to implement a play style capable of applying vibration to the goggle device 150 attached with the game system 1.

Next, with reference to FIG. 9, FIG. 10 and FIG. 13, the image displayed on the main body apparatus 2 will be described. FIG. 13 is an illustration view showing non-limiting example images displayed on the display 12 of the main body apparatus 2 in a stereoscopic display mode and a non-stereoscopic display mode, respectively.

In this embodiment, it is settable either of the stereoscopic display mode that the game system 1 is attached to the goggle device 150, and the image displayed on the display 12 of the main body apparatus 2 is viewed stereoscopically, or the non-stereoscopic display mode that the game system 1 is detached from the goggle device 150, and the image displayed on the display 12 of the main body apparatus 2 is viewed directly. The main body apparatus 2 displays an image(s) on the display 12 according to the mode being set. Here, the stereoscopic image for stereoscopically viewing may be images that the user can stereoscopically view by viewing the right-eye image and the left-eye image having parallax. In this case, the non-stereoscopic image to be viewed non-stereoscopically may be an image other than the above-described two-image display (stereoscopic display), and typically, may be a single image that the user views with right-eye and the left-eye.

In the stereoscopic display mode, the game system 1 constructs a content image that is a display target (for example, an image for displaying a part of the virtual space or the real space) by the left-eye image IML and the right-eye image IMR having parallax, and displays the left-eye image IML in the left side area of the display 12 and the right-eye image IMR in the right side area of the display 12. Specifically, as shown in FIG. 9, when the main body apparatus 2 is attached to the goggle device 150 in the stereoscopic display mode, the left-eye image IML is displayed in a first area that is substantially elliptical area capable of being visually recognized through the left lens 153L and is a part of the left side area of the display 12. Moreover, when the main body apparatus 2 is attached to the goggle device 150 in the stereoscopic display mode, the right-eye image IMR is displayed in a second area that is approximately elliptical area capable of being visually recognized through the right lens 153R and is a part of the right side area of the display 12.

As shown in FIG. 13, in the non-stereoscopic display mode, the game system 1 constructs the above-described content image that is the display target by a single image IMS that is a non-stereoscopic image, and for example, the single image IMS is displayed in the entire display area of the display 12.

As an example, an image of the virtual space viewed from a single virtual camera arranged in the virtual space is generated as the single image IMS. The above-described single virtual camera 220 is arranged in the virtual space so as to respond to the posture of the main body apparatus 2 (or game system 1) on the basis of the gravity direction in the real space (see FIG. 15). Then, the above-described single virtual camera 220 changes the posture thereof in the virtual space so as to correspond to the posture change of the main body apparatus 2 in the real space, and controls the direction of the line-of-sight of the virtual camera 220 according to the posture of the main body apparatus 2. Accordingly, the user who holds the game system 1 detached from the goggle device 150 can look around the virtual space by changing the display range of the virtual space displayed on the display 12 by an operation of changing the posture of the game system 1 for looking around, thereby to experience as if the user is actually at a place of the virtual camera.

Hereinafter, in this specification, a case where the stereoscopic display mode is set, and the goggle device 150 attached with the game system 1 is used will be described.

Figure 14:
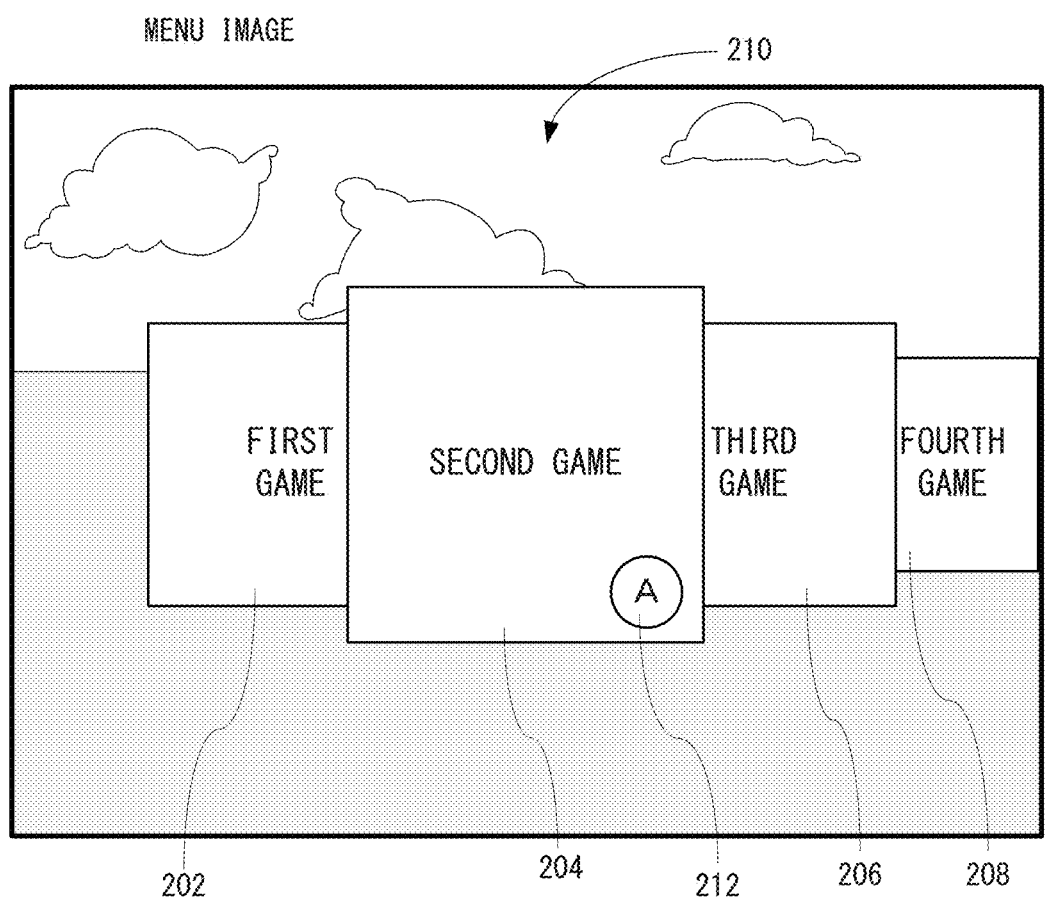
FIG. 14 is an illustration view showing a non-limiting example menu image to be displayed on the display of the main body apparatus.

In the game application of this embodiment, different types of a plurality of (here, four) individual games are prepared, and the user selects an individual game to play in advance from the menu. FIG. 14 shows a non-limiting example menu image. This menu image is displayed on the display 12 at the beginning of the game application.

The menu image includes a plurality of icons (in this embodiment, four icons 202, 204, 206 and 208). Moreover, the menu image includes a plurality of background objects 210. The icons 202-208 are operation target objects to be operated by the user, and respectively arranged at predetermined positions in the virtual space. Moreover, each of the icons 202-208 is a square plate-like object, and the icons 202-208 are set in sizes capable of being simultaneously settled in the field of view of the virtual camera 220 (see FIG. 17). The icon 202 is provided in order to perform game processing of a first game. The icon 204 is provided in order to perform game processing of a second game. The icon 206 is provided in order to perform game processing of a third game. The icon 208 is provided in order to perform game processing of a fourth game. That is, predetermined processing is associated with each of the icons 202-208.

In this embodiment, the plurality of background objects 210 are an island object, a sea object, a ship object, a sea object, a sky object and a cloud object.

The menu image shown in FIG. 14 indicates a state where the icon 204 is specified (or selected) by the line-of-sight, and a designation image 212 is displayed on the front of the icon 204 as operation information for turning on (or touch) this icon 204. That is, the icon (here, icon 204) specified by the line-of-sight of the virtual camera 220 is set in an operable state, and the designation image 212 for indicating this is displayed superimposed on the icon. However, the designation image 212 also indicates that processing of the individual game relevant to the specified icon can be performed. In this embodiment, the designation image 212 using a pattern of a predetermined button (here, A button 53) for instructing a start or execution of the individual game is displayed. Therefore, in a state where other icon 202, 206 or 208 is specified by the line-of-sight, the designation image 212 is displayed superimposed on the front of the icon 202, 206 or 208.

However, when the icons 202-208 cannot be operated, the designation image 212 is not displayed.

Moreover, in this embodiment, the icon 202, 204, 206 or 208 specified by the line-of-sight of the virtual camera 220 is set in an operable state, and the designation image 212 is displayed superposed on the operable icon 202, 204, 206 or 208, but should not be limited to this. When a time period that the icon is specified by the line-of-sight of the virtual camera 220 continues for a predetermined time period (for example, 2-3 seconds), the icon 202, 204, 206 or 208 may be set in an operable state. This is because in a case where the user is looking around the virtual space, the individual game is prevented from being unintentionally started if the user erroneously depresses the A button 53 when the icon 202, 204, 206 or 208 is temporarily specified by the line-of-sight.

In the menu image shown in FIG. 14, as described later, the icon 204 is specified by the line-of-sight of the virtual camera 220 (see FIG. 15), and the icon 204 is displayed as more greatly than other icons 202, 206 and 208. In this embodiment, sizes of the icons 202-208 are changed stepwise according to a distance to the icon that the line-of-sight specifies. In the example shown in FIG. 14, the size of the icon 204 that the line-of-sight specifies is made one step larger than a default size, the size of the icon 208 is made one step smaller than the default size, and the size of each of the icons 202 and 206 is made the same as the default size. When the size of each of the icons 204-208 is made one step larger than the default size, for example, the icon is enlarged to a size obtained by multiplying the default size by a first predetermined multiple (for example, 1. 2). Moreover, when the size of each of the icons 204-208 is made one step smaller than the default size, for example, the icon is reduced to a size obtained by multiplying the default size by a second predetermined multiple (for example, 0. 8).

Although illustration is omitted, when the icon 202 is specified by the line-of-sight, the size of the icon 204 is the default size, the size of the icon 206 is made one step smaller than the default size, and the size of the icon 208 is made two steps smaller that the default size.

Moreover, in this embodiment, the distances of the icons 202-208 with the virtual camera 220 are adjusted according to the sizes thereof. When making the size of the icon 202, 204, 206 or 208 one step larger, the icon 202, 204, 206 or 208 is moved to a position that approaches the virtual camera 220 by a predetermined distance from a default position. Moreover, when making the size of the icon 202, 204, 206 or 208 one step smaller, the icon 202, 204, 206 or 208 is moved to a position that is a predetermined distance away from the default position with respect to the virtual camera 220, and when making the size of the icon 202, 204, 206 or 208 two steps smaller, the icon 202, 204, 206 or 208 is moved to a position that is twice the predetermined distance away from the default position with respect to the virtual camera 220. However, the default position is a predetermined position when each of the icons 202-208 is arranged in the virtual space.

Since the sizes and positions of the icon 202, 204, 206 and 208 are thus changed, the specified icon 202, 204, 206 or 208 can be expressed so as to be visibly confirmed.

However, it may express that the icon is being specified by enlarging only the size of the icon 202, 204, 206 or 208 that is specified by the line-of-sight.

Figure 15:
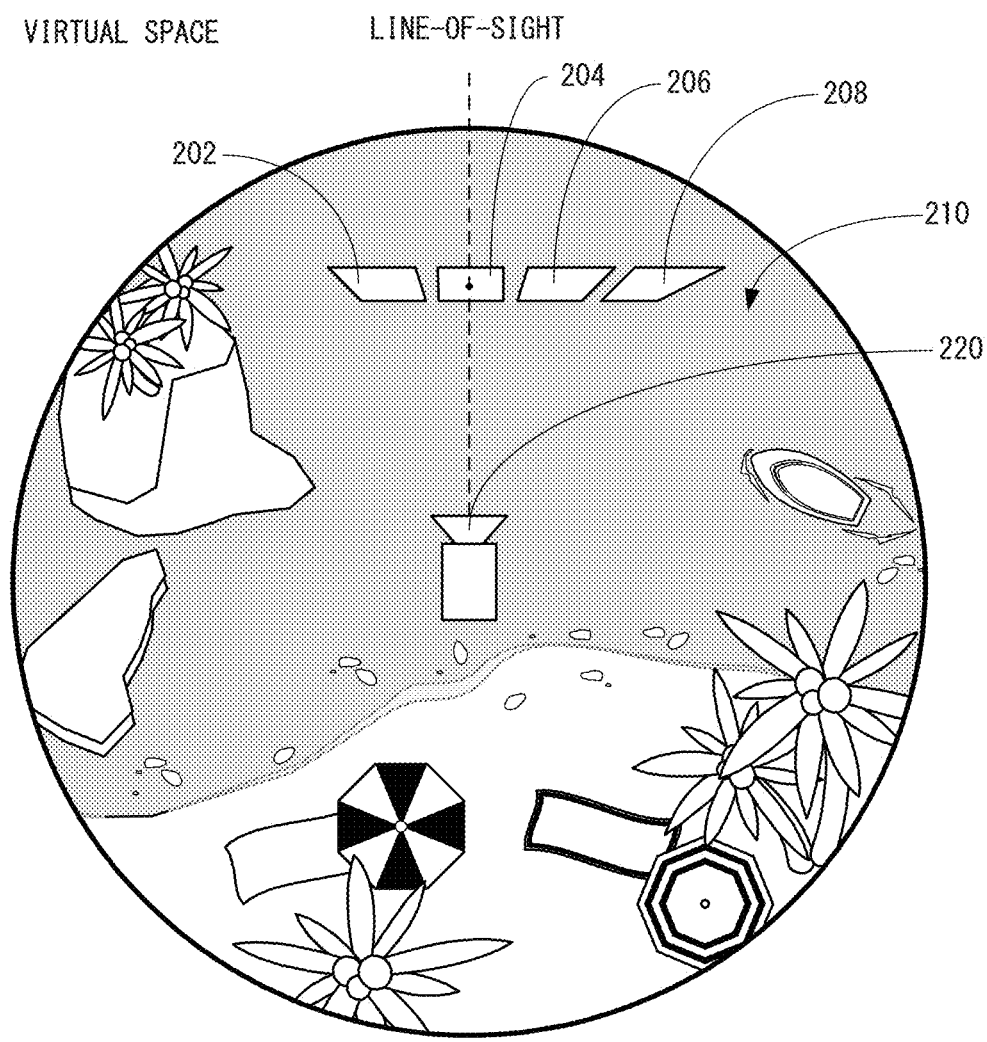
FIG. 15 is an illustration view showing a non-limiting example virtual space constructed for displaying the menu image, being viewed from the above.

FIG. 15 is an illustration view of the virtual space including the icons 202-208 overlooked from the above. The virtual space is formed in a shape of a hollow sphere. The virtual camera 220 is located at a position of the center of the sphere. That is, the virtual camera 220 is located at the predetermined position in the virtual space. As is apparent from FIG. 15, the virtual camera 220 is arranged in a position different from those of the icons 202-208. Moreover, a reference direction of the virtual camera 220 is decided in advance. As shown in FIG. 15, the reference direction is set in a direction that the line-of-sight of the virtual camera 220 is perpendicular to the plate-like icon 204 and passes through the center of the icon 204. This is an example and should not be limited to this.

As described above, when the posture or direction of the head of the user who looks into the goggle device 150 attached with the game system 1 is changed, the changed posture or direction can be calculated, and therefore, the posture or direction of the virtual camera 220 is controlled based on the calculated posture or direction. That is, the movement of the virtual camera 220 is changed based on the movement of the head of the user. The user may move the head by moving the neck, or may move the head by changing the orientation of the whole body or the upper body.

However, in the local coordinates of the virtual camera 220, an axis that is overlapped with the line-of-sight at the time that the virtual camera faces the reference direction is set as an x-axis, an axis perpendicular to the x-axis in the horizontal direction is set as a y-axis, and an axis perpendicular to both the x-axis and the y-axis is set as a z-axis. Then, the posture or direction of the virtual camera 220 can be represented by an angle around the y-axis (pitch angle), an angle around the x-axis (roll angle) and an angle around the z-axis (yaw angle).

Accordingly, various menu images in the virtual space viewed from the virtual camera 220 are displayed on the display 12 based on the movement of the head of the user, and the user can also view the menu image not including the icons 202-208. In this embodiment, the background objects 210 includes an island object, a sea object, a ship object, a sky object and a cloud object, and it is possible to view the scenery of the virtual sea other than the menu. That is, not only the icons 202-208 are displayed but also a gorgeous menu that shows objects other than the icons 202-208 is provided.

Figure 16:
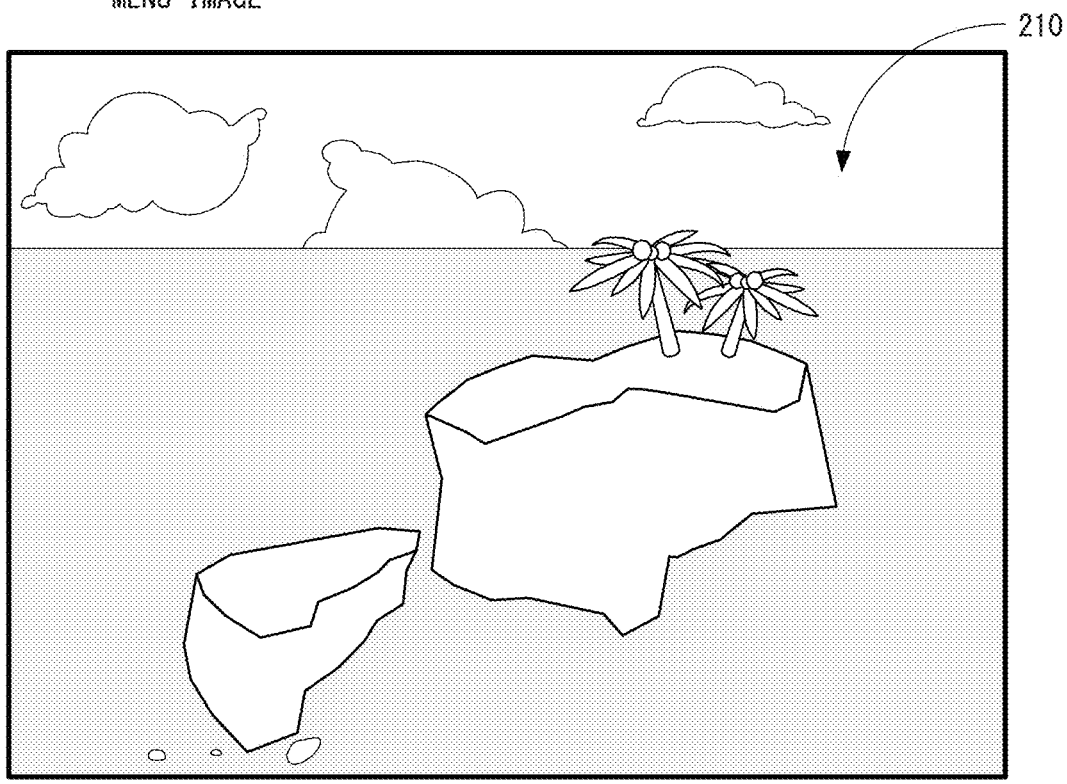
FIG. 16 is an illustration view showing another non-limiting example menu image to be displayed on the main body apparatus.

Thus, objects other than icons 202-208 may be displayed in the menu image of this embodiment. FIG. 16 shows another non-limiting example menu image. The icons 202-208 are not included in the menu image shown in FIG. 16. For example, if the user rotates his/her head leftward 90 degrees in the state shown in FIG. 15, the virtual camera 220 is rotated 90 degrees toward the left, and at this time, the menu image shown in FIG. 16 will be displayed on the display 12. In the menu image shown in FIG. 16, a plurality of island objects, a sea object, a sky object and a plurality of cloud objects are included as the background object 210.

In addition, the background far away from the virtual camera 220 is texture stuck on an inside of the sphere that defines the size and shape of the virtual space.

By thus moving the head, the user can view the menu image in the direction of 360 degrees in the virtual space (in this embodiment, a horizontal direction and a vertical direction). Therefore, in the virtual space for displaying the menu image, the user can visually recognize various objects other than icons 202-208.

Moreover, in this embodiment, the direction of the virtual camera 220 is reset by depressing the analog stick 52. Specifically, the virtual camera 220 is rotated in the horizontal direction so that a horizontal component of the vector that indicates the direction of the line-of-sight is in agreement with the reference direction. That is, the yaw angle of the virtual camera 220 is reset (for example, made to be 0 degree). This is because when the user loses sight of the icons 202-208, the user can easily return to the menu image including the icons 202-208. However, it is thought that there may be a case of wishing to easily return to the menu screen including the icons 202-208.

In addition, a reason why only the yaw angle is reset when resetting the direction of the virtual camera 220 is that if the pitch angle and the roll angle are also reset, the posture of the virtual camera 220 cannot be changed in the virtual space in correspondence to the change in the posture of the main body apparatus 2 in the real space. However, not only the yaw angle but the pitch angle and the roll angle may be reset.

Moreover, although the direction of the virtual camera 220 is changed in this embodiment, the background object 210 in the virtual space may be moved so that the horizontal component of the vector that indicates the direction of the line-of-sight is in agreement with the reference direction. In this case, the position that the texture of the background far away from the virtual camera 220 is to be stuck is changed in accordance with the movement of the background object 210.

If the user performs processing based on an operation input that turns on (or clicks) the icon 202, 204, 206 or 208 when the icons 202-208 are not displayed on the display 12 as in the menu image shown in FIG. 16, processing (in this embodiment, processing of the individual game) according to the specified icon 202, 204, 206 or 208 will be started unintentionally.

In order to avoid such inconvenience, in this embodiment, when the icons 202, 204, 206 and 208 are included in the menu image, it is made to perform processing based on the operation input that turns on the icon 202, 204, 206 or 208.

However, the icons 202, 204, 206 and 208 need not all be simultaneously included in the menu image.

Figure 17:
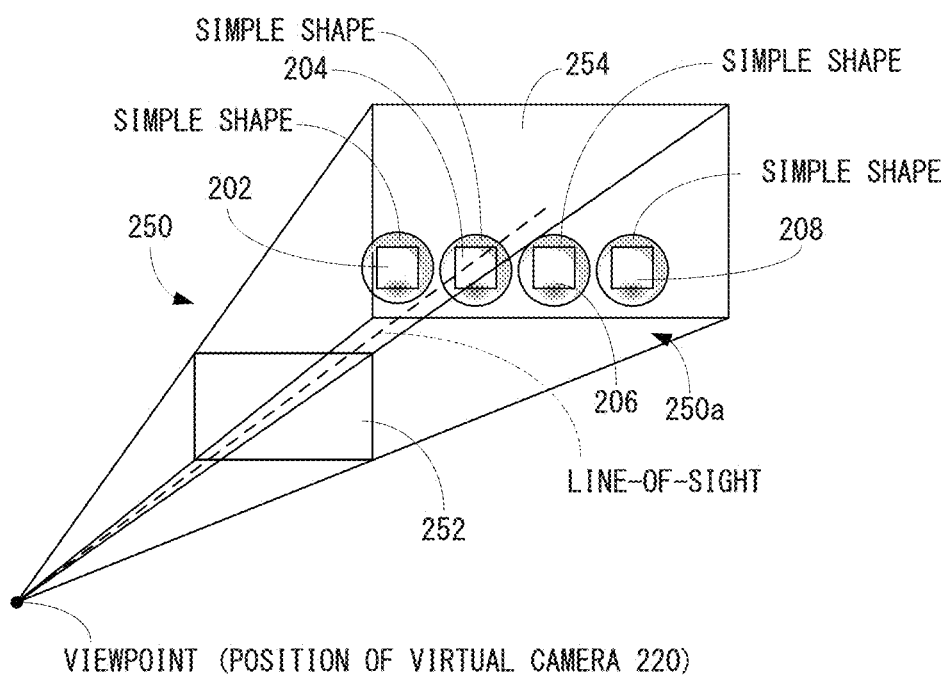
FIG. 17 is an illustration view showing a pyramid that is an imaging range of a virtual camera, being viewed obliquely behind a position of the virtual camera.

Therefore, in this embodiment, it is determined that the icons 202-208 included in the field of view of the virtual camera 220 can be operated. FIG. 17 is an illustration view showing a pyramid 250 that is an imaging range of the virtual camera 220, as viewed obliquely behind a position of the virtual camera 220. In the pyramid 250, a portion of a truncated pyramid sandwiched between a near clipping plane 252 and a far clipping plane 254 is a view volume 250a. However, the pyramid (quadrangular pyramid) 250 is decided by the position (viewpoint) of the virtual camera 220 and the far clipping plane 254. Moreover, an inclination of a hypotenuse of the pyramid (an angle of view of the virtual camera 220) is decided by a distance between the virtual camera 220 and the far clipping plane 254, and a size of the far clipping plane 254.

In addition, in FIG. 17, various kinds of background objects other than the icons 202-208 are omitted. Moreover, FIG. 17 shows a state where a simple shape described later is set to each of the icons 202-208.

Whether the icons 202-208 are included in the field of view of the virtual camera 220 is determined by determining whether the icons 202-208 are located (or included) within the view volume 250a.

Moreover, in this embodiment, the icon 202, 204, 206 or 208 is specified or selected by the direction of the head of the user, i.e., the line-of-sight of the virtual camera 220. That is, the icon 202, 204, 206 or 208 is specified or selected by the user.

In this embodiment, it is determined whether each of the icons 202-208 is included in the field of view of the virtual camera 220 and it is determined whether the icon 202, 204, 206 or 208 is specified, by setting a simplified shape (hereinafter, called "simple shape") to each of the icons 202-208.

Figure 18:
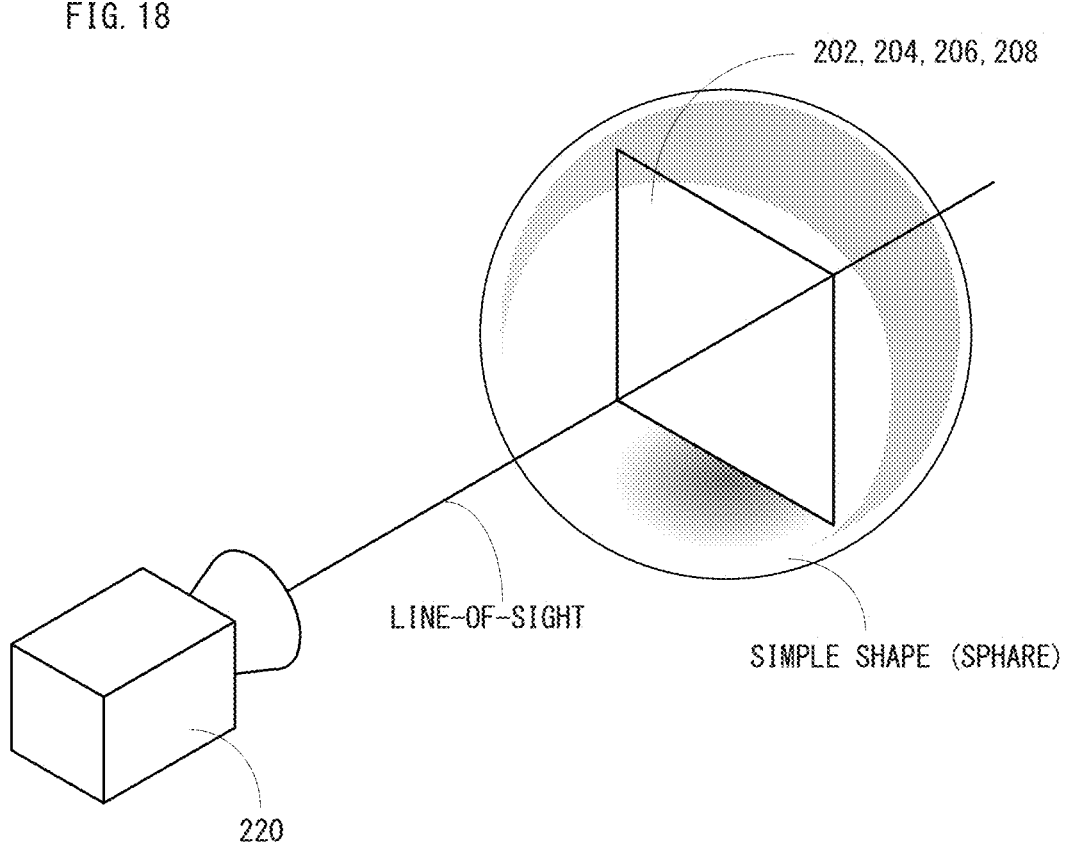
FIG. 18 is an illustration view showing a non-limiting example simple shape being set to an icon and a non-limiting example method of determining whether the icon is selected.

As shown in FIG. 18, as an example, the simple shape is a sphere and is set to each of the icons 202-208. Therefore, it is calculated whether the line-of-sight (three-dimensional line segment) touches the sphere set to each of the icons 202-208 in the three-dimensional virtual space, and if the line-of-sight touches the sphere, it is determined that the icon 202, 204, 206 or 208 to which the sphere is set is specified by the line-of-sight.

Moreover, the center of each sphere is set to be in agreement (or to overlap) with the center (or center of gravity) of each of the icons 202-208. The radius R of each sphere is set to such a length that the simple shapes set in the adjacent one or two icons out of the icons 202-208 do not contact or overlap with each other.

In this embodiment, as shown in FIG. 15, the icons 202-208 are arranged with intervals in the virtual space, and therefore, the radius R of the sphere is set to a value smaller than a value (D/2) obtained by halving the distance D between the centers of the adjacent icons 202 and 204, icons 204 and 206, and icons 206 and 208. Moreover, the radius R of the sphere is set based on the length of a vertical or horizontal side of each of the icons 202-208. The icons 202-208 are quadrangles of the same size. Therefore, the radius R is set to a value longer than the length (L1/2) of the half of the length L1 of the vertical or horizontal side of each of the icons 202-208. That is, the radius R is a numerical value between L1/2 and D/2.

However, this is an example, and the radius R of the sphere may be set to the length (L2/2) of the half of the length L2 of the diagonal line of each of the icons 202-208. That is, a sphere in which each of the icons 202-208 is inscribed may be set. In each of pairs of the adjacent icons 202 and 204, icons 204 and 206, and icons 206 and 208, when the spheres overlap with each other, it is determined that the icon 202, 204, 206 or 208 set to the sphere that the line-of-sight first touched is specified as to a portion that the spheres overlap. However, it may be determined that the icon 202, 204, 206 or 208 that is set to the sphere that the line-of-sight touches later is specified.

Thus, the icon 202, 204, 206 or 208 is specified by the line-of-sight of the virtual camera 220. Moreover, as described above, since the icons 202-208 are all set to sizes to be included in the field of view of the virtual camera 220 simultaneously, the icon 202, 204, 206 or 208 specified by the line-of-sight is surely included in the field of view (or within the view volume). Accordingly, in this embodiment, when the line-of-sight touches the sphere set to the icon 202, 204, 206 or 208, it is determined, at least, that the icon 202, 204, 206 or 208 to which the sphere is set is included in the field of view, and it is determined that the icon 202, 204, 206 or 208 is specified by the line-of-sight of the virtual camera 220, that is, the icon 202, 204, 206 or 208 is specified or selected by the user.

Figure 19:
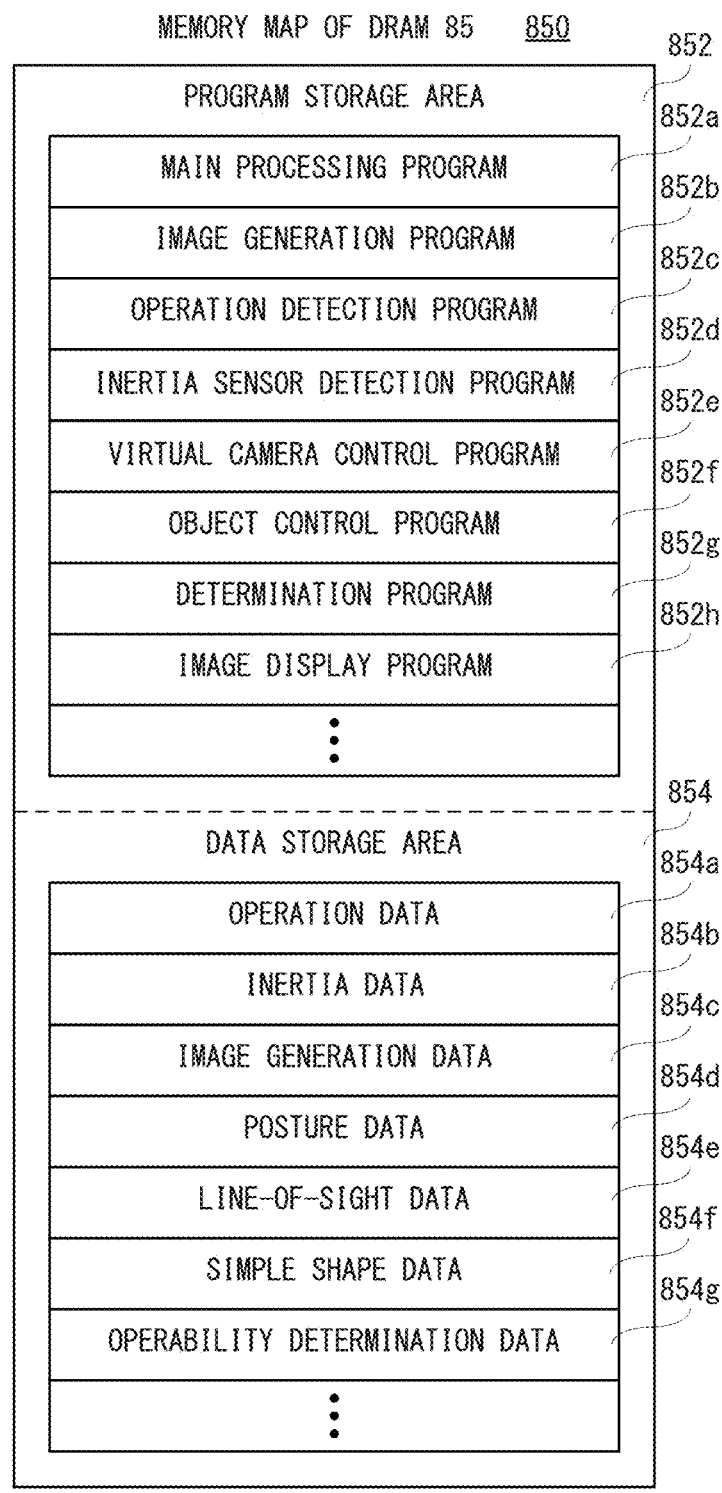
FIG. 19 is an illustration view showing a non-limiting example memory map of a DRAM of the main body apparatus shown in FIG. 6.

FIG. 19 is an illustration view showing a non-limiting example memory map 850 of the DRAM 85 shown in FIG. 6. As shown in FIG. 19, the DRAM 85 includes a program storage area 852 and a data storage area 854. The program storage area 852 is stored with a program of a game application (i.e., game program) that is an example of an information processing program. As shown in FIG. 16, the game program includes a main processing program 852a, an image generation program 852b, an operation detection program 852c, an inertia sensor detection program 852d, a virtual camera control program 852e, an object control programs 852f, a determination program 852g, an image display program 852h, etc.

However, a function displaying generated images such as a menu image and a game image is a function that the main body apparatus 2 is provided with. Therefore, the image display program 852h is not included in the game program.

Although detailed description is omitted, at a proper timing after the power of the main body apparatus 2 is turned on, a part or all of each of the programs 852a-852g is read from the flash memory 84 and/or a storage medium attached to the slot 23 so as to be stored in the DRAM 85. However, a part or all of each of the programs 852a-852g may be acquired from other computers capable of performing communication with the main body apparatus 2. Moreover, the image display program 852h is stored in the DRAM 85 from the flash memory 84 at a proper timing after the power of the main body apparatus 2 is turned on.

The main processing program 852a is a program for performing overall game processing of the virtual game of this embodiment. The image generation program 852b is a program for generating, using image generation data 854c, display image data corresponding to various kinds of images including the menu image, the game image, etc. The operation detection program 852c is a program for acquiring the operation data 854a from the left controller 3 and/or the right controller 4. That is, the operation data 854a according to the operation input by the player is acquired.

The inertia sensor detection program 852d is a program for acquiring data of a detection result of the inertia sensor, i.e., detection results of the acceleration sensor 89 and the angular velocity sensor 90 (inertia data 854b, described later).

The virtual camera control program 852e is a program for controlling the posture or direction of the virtual camera 220 based on the inertia data 854b acquired according to the inertia sensor detection program 852d.

The object control program 852f is a program for controlling the motion or action of a player object according to the operation input by the player, or for controlling, with no relation to the operation input by the player, the motion or action of non-player objects and some background objects 210. However, some background objects 210 are moving objects such as a ship.

The determination program 852g is a program for determining whether there is an operable icon 202, 204, 206 or 208 by determining whether the line-of-sight touches the simple shape set to each of the icons 202-208 when the menu image is displayed on the display 12.

The image display program 852h is a program for outputting the display image data generated according to the image generation program 852b to the display device. Therefore, the images (the menu image, the game image, etc.) corresponding to the display image data are displayed on the display device such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854a, inertia data 854b, image generation data 854c, posture data 854d, line-of-sight data 854e, simple shape data 854f, operability determination data 854g, etc.

The operation data 854a is operation data received from the left controller 3 and/or the right controller 4. In this embodiment, when the main body apparatus 2 receives the operation data from both the left controller 3 and the right controller 4, the main body device 2 stores the operation data 854a classified into the left controller 3 and the right controller 4, respectively.

The inertia data 854b is data about the detection results of the acceleration sensor 89 and the angular velocity sensor 90, i.e., acceleration and angular velocity.

The image generation data 854c is data required for generating an image, such as polygon data and texture data.

The posture data 854d is data for the posture or direction of the virtual camera 220. That is, the posture data 854d is data of the pitch angle, the yaw angle and the roll angle of the virtual camera 220.

The line-of-sight data 854e is data about a straight line extended in a direction indicated by the posture data 854d from the three-dimensional position of the virtual camera 220. However, the length of the straight line is decided as predetermined length. For example, the predetermined length is set to the length that reaches the icon 202, 204, 206 or 208 arranged in the front of the virtual camera 220.

The simple shape data 854f is data of the simple shape set to each of the icons 202, 204, 206 and 208, and in this embodiment, data related to the coordinates of the center of each of the icons 202, 204, 206 and 208 and the radius R of the sphere that is the simple shape.

The operability determination data 854g is data of identification information for identifying the icon 202, 204, 206 or 208 being operable. However, when all the icons 202-208 are not operable, data (for example, null data) indicating that there is no operable icon is stored as the operability determination data 854g.

Although illustration is omitted, the data storage area 854 is stored with other data required for executing the game program, and provided with other flags and timers (counters).

Figure 20:
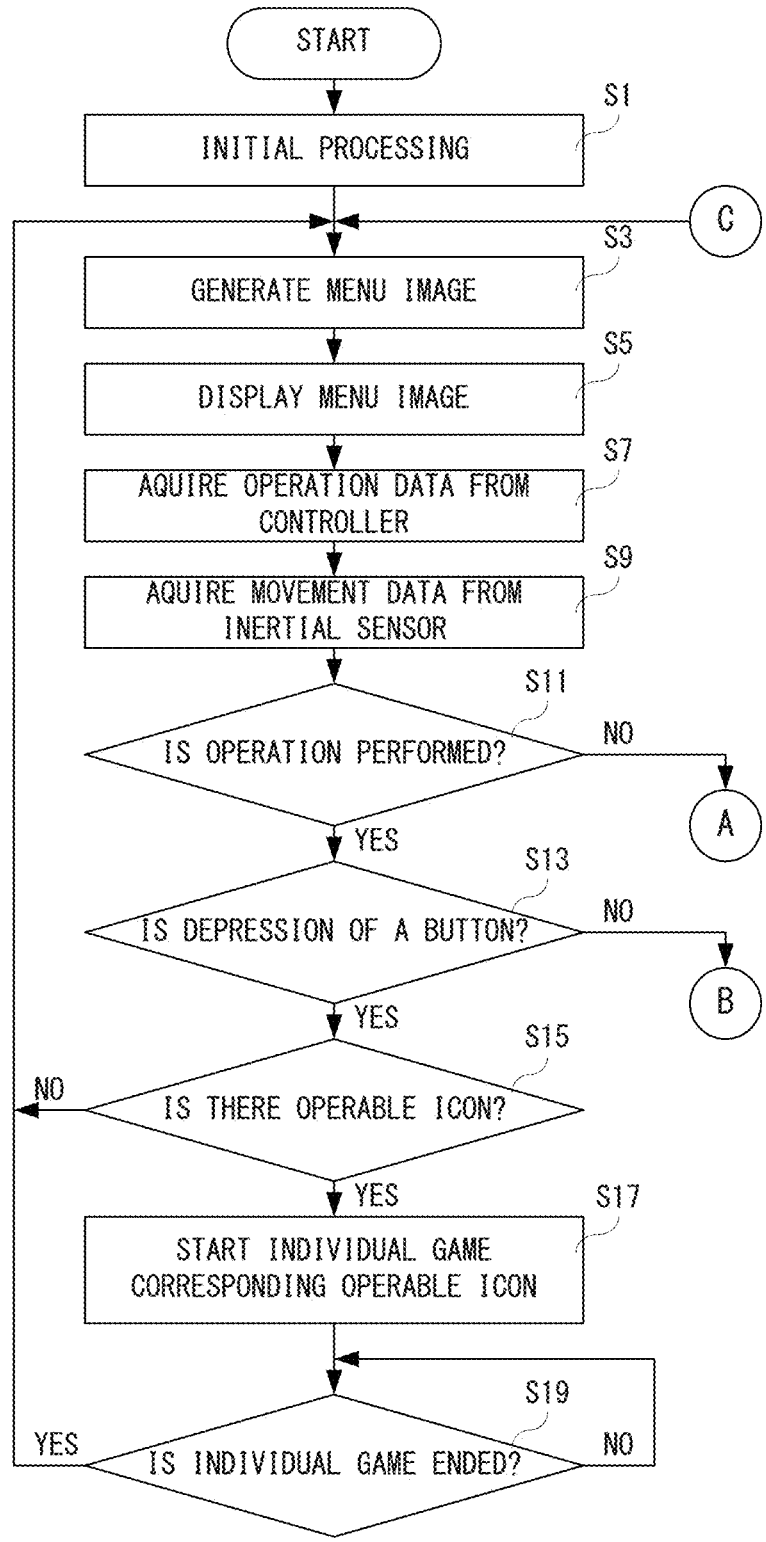
FIG. 20 is a flowchart showing a part of non-limiting example overall game processing by a processor of the main body apparatus shown in FIG. 6.
Figure 21:
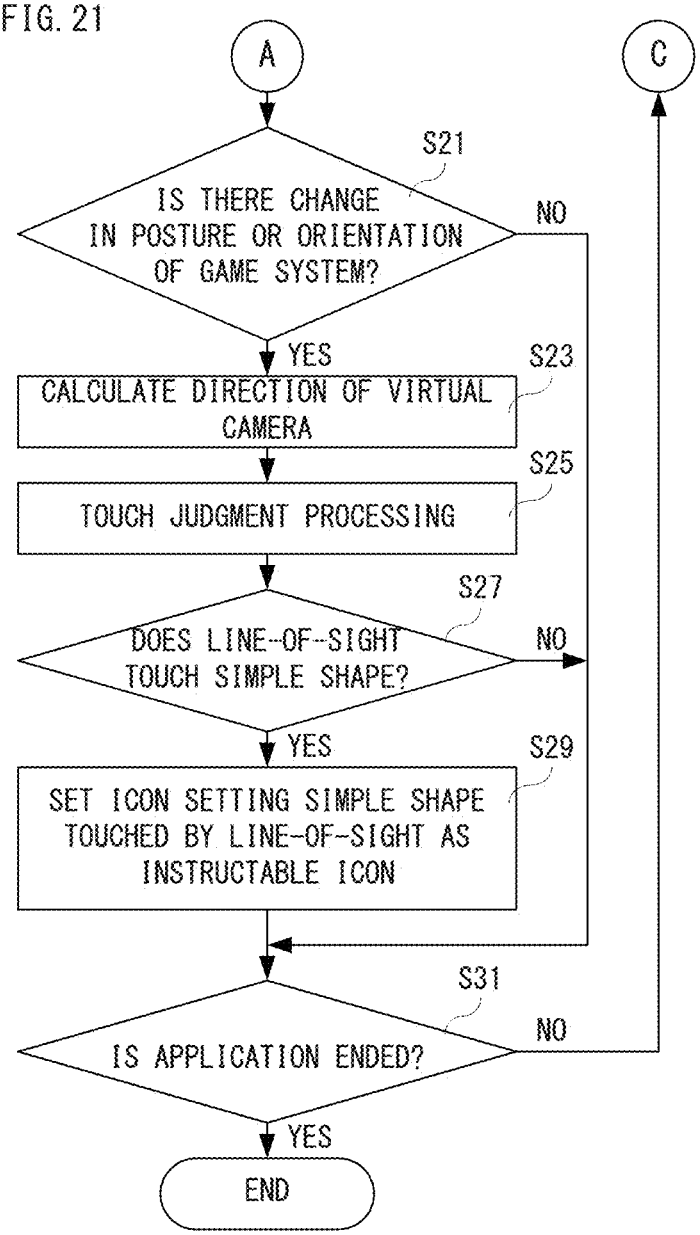
FIG. 21 is a flowchart showing another part of the non-limiting example overall game processing by the processor of the main body apparatus shown in FIG. 6, following FIG. 20.
Figure 22:
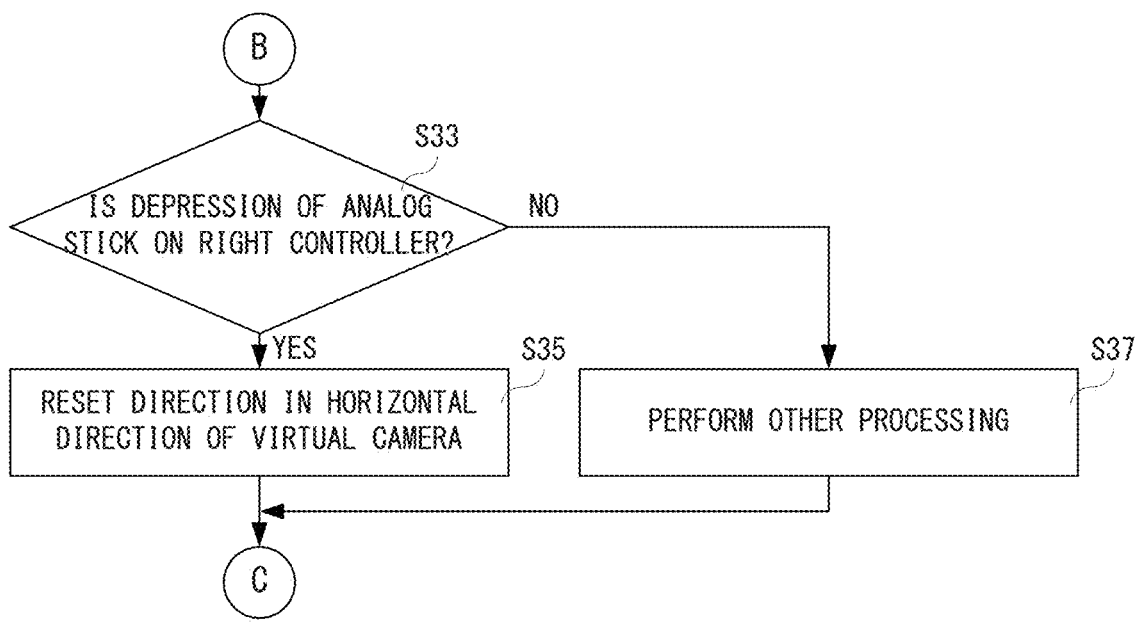
FIG. 22 is a flowchart showing the other part of the non-limiting example overall game processing by the processor of the main body apparatus shown in FIG. 6, following FIG. 20.

FIG. 20-FIG. 22 are flowcharts showing non-limiting example processing of the game program (overall game processing) by the processor 81 (or computer) of the main body apparatus 2.

However, processing of respective steps of the flowcharts shown in FIG. 20-FIG. 22 are mere examples, and if the same or similar result is obtainable, an order of the respective steps may be exchanged. Moreover, in this embodiment, it is described that the processor 81 basically performs the processing of each step of the flowcharts shown in FIG. 20-FIG. 22; however, some steps may be executed by a processor(s) and/or a dedicated circuit(s) other than the processor 81.

When the power of the main body apparatus 2 is turned on, prior to executing the overall game processing, the processor 81 executes a boot program stored in a boot ROM not shown, whereby respective units such as the DRAM are initialized. The main body apparatus 2 starts the overall game processing when the user instructs to execute the game program of this embodiment.

As shown in FIG. 20, when the overall game processing is started, the processor 81 executes initial processing in a step S1. In the initial processing, for example, the processor 81 constructs a virtual space for generating and displaying the menu image for performing selection and execution of the individual game, and places respective background objects 210 appearing in the virtual space at their initial positions. Moreover, the processor 81 sets the position of the virtual camera 220 at an initial position. Furthermore, the processor 81 sets the horizontal component of the vector indicative of the direction of the line-of-sight of the virtual camera 220 to the reference direction. That is, a standard value of the yaw angle of the virtual camera 220 is set to the reference direction. Moreover, the processor 81 sets the pitch angle and the roll angle of the virtual camera 220 based on the outputs of the acceleration sensor 89 and the angular velocity sensor 90 so as to correspond to the posture of the main body apparatus 2 in the real space.

In addition, although detailed description is omitted, prior to the start of the overall game processing, the processor 81 determines whether the left controller 3 and the right controller 4 are attached to the main body apparatus 2, and when the left controller 3 and the right controller 4 are detached from the main body apparatus 2, performs pairing processing between the main body apparatus 2 and both of the left controller 3 and the right controller 4.

In a subsequent step S3, a menu image is generated. At the beginning of the overall game processing, a menu image including all the icons 202-208 is generated. However, in this embodiment, since it is assumed that the stereoscopic display mode is set, as the menu image, the left-eye image IML and the right-eye image IMR are generated.

The menu image is displayed in a next step S5. In this step S5, the left-eye image IML is displayed in the first area of the display 12, and the right-eye image IMR is displayed in the second area of the display 12. Moreover, at the beginning of the overall game processing, the menu image as shown in FIG. 16 is displayed on the display 12.

Subsequently, the processor 81 acquires, in a step S7, the operation data transmitted from the controller(s) (3, 4). However, when the operation data is not transmitted from the controller(s) (3, 4), the processor 81 does not acquire operation data.

Moreover, the processor 81, in a step S9, acquires the inertia data 854b transmitted from the inertia sensor. That is, the processor 81 acquires the acceleration data from the acceleration sensor 89 and the angular velocity data from the angular velocity sensor 90.

In a next step S11, the processor 81 determines whether there is any operation. Here, the processor 81 determines whether the operation data is acquired in the step S7. If "NO" is determined in the step S11, that is, if no operation, the process proceeds to a step S21 shown in FIG. 19.

On the other hand, if "YES" is determined in the step S11, that is, if there is an operation, it is determined, in a step S13, whether the operation is depression of the A button 53. That is, the processor 81 determines whether the acquired operation data indicates the depression of the A button. If "NO" is determined in the step S13, that is, if it is not the depression of the A button 53, the process proceeds to a step S33 shown in FIG. 22.

On the other hand, if "YES" is determined in the step S13, that is, if it is the depression of the A button 53, it is determined, in a step S15, whether there is an operable icon. In this embodiment, the processor 81 determines whether there is the operable icon 202, 204, 206 or 208 with reference to the operability determination data 854g.

If "NO" is determined in the step S15, that is, if there is no operable icon, the process returns to the step S3. On the other hand, if "YES" is determined in the step S15, that is, if there is an operable icon, an individual game corresponding to the operable icon is started in a step S17. That is, the individual game processing is performed. Although illustration and description about specific processing are omitted, the processing of the individual game is performed by a flow chart separated from the overall game processing. If starting the individual game, a game image for a scene of the individual game will displayed on the display 12 in replace with the menu image. That is, the processor 81 performs processing of transitioning from a menu scene to a scene that the individual game related to the icon 202, 204, 206 or 208 that is operated is played.

Then, the processor 81 determines, in a step S19, whether the individual game is to be ended. If "NO" is determined in the step S19, that is, if the individual game is not to be ended, the process returns to the step S19. On the other hand, if "YES" is determined in the step S19, that is, the individual game is to be ended, the process returns to the step S3.

In addition, instead of performing the processing of the step S19, the overall game processing may be suspended till the end of the individual game. In this case, the processor 81 resumes the overall game processing according to the end of the individual game.

As shown in FIG. 21, in the step S21, the processor 81 determines whether the posture or direction of the game system 1 is changed based on the inertia data 854b acquired in the step S9. If "NO" is determined in the step S21, that is, if the posture or direction of the game system 1 is not changed, the process proceeds to a step S31. On the other hand, if "YES" is determined in the step S21, that is, if the posture or direction of the game system 1 is changed, the posture or direction of the virtual camera 220 is calculated in a step S23. That is, the processor 81 changes the posture or direction of the virtual camera 220 based on the change of the posture or direction of the game system 1.

In a next step S25, touch determination processing is performed. In the touch determination processing, the processor 81 calculates whether the line-of-sight of the virtual camera 220 touches the simple shape set to each of the icons 202-208. Therefore, objects corresponding to the line-of-sight of the virtual camera 220 and the simple shapes are not actually drawn.

Subsequently, it is determined, in a step S27, whether the line-of-sight of the virtual camera 220 touches the simple shape. If "NO" is determined in the step S27, that is, if the line-of-sight of the virtual camera 220 does not touch the simple shape, the process proceeds to a step S31. However, when it is determined that the line-of-sight of the virtual camera 220 does not touch the simple shapes in the touch determination processing, the null data is stored as the operability determination data 854*g*.

On the other hand, if "YES" is determined in the step S27, that is, if the line-of-sight of the virtual camera 220 touches the simple shape, the processor 81 set the icon 202, 204, 206 or 208 to which the line-of-sight of the virtual camera 220 touches as the operable icon, and then, the process proceeds to a step S31. In the step S29, the data indicative of the operable icon 202, 204, 206 or 208 is stored as the operability determination data 854*g*.

In the step S31, it is determined whether the game application is to be ended. Determination in the step S31 is made according to whether the player instructs that the game application is to be ended. If "NO" is determined in the step S31, that is, that the game application is not ended, the process returns to the step S3 in FIG. 20. On the other hand, if "YES" is determined in the step S31, that is, if the game application is to be ended, the overall game processing is terminated.

Moreover, if "NO" is determined in the step S13 in FIG. 20, as described above, it is determined, in a step S33 shown in FIG. 22, whether it is the depression of the analog stick 52 of the right controller 4. That is, it is determined whether the operation data acquired in the step S7 is indicative of the depression of the analog stick 52.

If "YES" is determined in the step S33, that is, if it is the depression of the analog stick 52, the horizontal direction of the virtual camera 220 is reset, and then, the process returns to the step S3. That is, in the step S35, the processor 81 resets the yaw angle without resetting the pitch angle and roll angle of the virtual camera 220.

On the other hand, if "NO" is determined in the step S33, that is, if it is not the depression of the analog stick 52, other processing is performed in a step S37, and then, the process returns to the step S3. For example, in response to depression of the B button 54, the non-stereoscopic display mode is set in the step S37.

In addition, although the touch determination processing is performed when the posture or direction of the game system 1 is changed in the overall game processing shown in FIG. 20-FIG. 22, it does not need to be limited to this. In another embodiment, the touch determination processing may be performed for every predetermined time period (for example, for each frame) during the time that the menu image is being displayed, or performed at the time that the A button 53 is depressed. Moreover, the touch determination processing may be performed both when the posture or direction of the game system 1 is changed and when the A button 53 is depressed.

According to this embodiment, since processing relevant to an operation target object is performed if the operation target object is included in the field of view when there is an operation input to this operation target object, it is possible to prevent the processing that is unintended by the user from being performed.

In addition, although the posture or direction of the virtual camera is controlled in accordance with the posture or direction of the goggles device based on the detection result of the inertia sensor in this embodiment, it does not need to be limited to this. The position of the virtual camera may be also controlled by detecting the position of the goggles device based on the detection result of the inertia sensor. In such a case, the position of the virtual camera is changed in the virtual space as well as the posture or direction thereof. Moreover, when being reset, the direction of the horizontal direction of the virtual camera is returned to the reference direction, and the position of the virtual camera is returned to the initial position.

Moreover, although this embodiment is described on a case where the operation target object is an icon, it does not need to be limited to this. In another embodiment, the operation target object may be a character object that can be made to be performed an arbitrary action by the user. If such a case, if the character object is included in the field of view when there is an operation input for the character object, this character object is made to perform a motion or action according to the operation input. However, when the character object is outside the field of view, even if there is the operation input by the user, the character object is not made to perform a motion or action according to the operation input.

Furthermore, although the operation target object is specified by the line-of-sight of the virtual camera in this embodiment, it does not need to be limited to this. The operation target object may be specified based on the operation data acquired from the controller in a state where the operation target object is included in the field of view. In this case, for example, when of a plurality of operation target objects are included in the field of view, it is possible to specify and change to a single operation target object by operating the right direction button 33, the down direction button 34, the up direction button 35 and the left direction button 36. Alternatively, by assigning a different predetermined button to each of one or more operation target objects included in the field of view of the virtual camera, it is also possible to specify and execute a single operation target object at a time by operating a predetermined button. In this case, if the predetermined button is assigned to the operation target object as shown in FIG. 14, the designation image using a pattern of the predetermined button is displayed on the front of the operation target object superposed.

Furthermore, although it is determined whether the operation target object is included in the field of view by determining whether the simple shape that is set to the operation target object is included in the field of view in this embodiment, it does not need to be limited to this. It may be determined whether one or more operation target objects are included in the field of view by calculating an inner product of a line-of-sight vector of the virtual camera and a vector from the position of the virtual camera toward the position of the operation target object (here, the center position), and then, based on the calculated cos $\theta$ value. Alternatively, it may be determined whether one or more operation target objects are included in the field of view based on whether the line-of-sight direction of the virtual camera is within the reference value of the horizontal angle in the horizontal plane including the position of the virtual camera. In this case, it is determined whether the calculated cos $\theta$ value is within the reference value by calculating an inner product of the line-of-sight vector of the virtual camera and the line-of-sight vector in a case where the virtual camera faces the reference direction.

Furthermore, although this embodiment is described on a case where the operation target object is included in the field of view, even when a part of the object is included in the field of view, the object may be made to be specified and executed. For example, when the operation target object is included in the field of view by a predetermined ratio (for example, 90%) or more, it is considered that the user can know the object. However, depending on the object, the user may be able to know the object even if the predetermined ratio is less than 50%. As an example, it is possible to set the ratio that the operation target object is included in the field of view by controlling a size (radius R) of the sphere that is set to the object. That is, when at least a part of the operation target object is included in the field of view, it is also possible to perform the processing related to the object in accordance with a user operation.

Furthermore, in this embodiment, by specifying one icon that is included in the field of view from four icons (i.e., operation target objects) provided in the menu image of the game application, the processing of the individual game relevant to the specified icon is performed, but it does not need to be limited to this. By specifying one icon included in the field of view out of a plurality of icons in relation to applications different from each other, the processing of the application relevant to the icon can be made to be performed. Moreover, when a plurality of options are set for the operation target object, processing for selecting one option from the plurality of options is the processing related to the object.

Furthermore, in this embodiment, when the goggle device is attached with the game system, the stereoscopic display mode is set and the stereoscopic image is displayed, but it does not need to be limited to this. Even if the goggle device is attached with the game system, the non-stereoscopic image may be displayed by generating the left-eye image and the right-eye image without parallax.

In addition, although the above-described embodiment is described on a case where the game system 1 having structure the left controller 3 and the right controller 4 are attached to or detached from the main body apparatus 2, it does not need to be limited to this. For example, it is possible to use an information processing apparatus such as a game apparatus or electronic equipment capable of executing a game program that a main body apparatus is provided with an operation portion having operating buttons and an analog stick similar to those of the left controller 3 and the right controller 4 integrally. Examples of other electronic device include smartphones and tablet PCs. In such a case, the operating portion may comprise software keys.

Moreover, specific numeral values, operation portion and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system comprising a wearable goggle assembly, the wearable goggle assembly including an inertia sensor, a display, a hardware operation portion and one or more processors, wherein the one or more processors are configured to, while the wearable goggle assembly is worn, execute:

displaying, on the display, an image of a virtual space included in a field of view of a virtual camera, the virtual space including an object for invoking predetermined processing, wherein the predetermined processing comprises transitioning to a scene related to the object;

acquiring movement data based on an output of the inertia sensor and operation data based on an operation input to the operation portion;

controlling posture of the virtual camera in the virtual space based on the movement data to provide images for display on the display of different portions of the virtual space;

detecting predetermined operation data corresponding to a predetermined operation input to the operation portion;

based on identifying that the object is included in a field of view of the virtual camera when the predetermined operation data is detected, performing the predetermined processing; and based on identifying that the object is not included in the field of view of the virtual camera when the predetermined operation input to the operation portion is provided, not performing the predetermined processing.

2. The information processing system according to the claim 1, wherein the one or more processors are further configured to execute identifying whether at least a part of the object is included in the field of view of the virtual camera.

3. The information processing system according to the claim 1, wherein the one or more processors are further configured to execute displaying, on the display, an image of the operation portion based on at least a part of the object being included in the field of view of the virtual camera.

4. The information processing system according to the claim 1, wherein the object includes a plurality of objects, and the one or more processors are further configured to execute specifying one object out of the plurality of objects based on at least a part of the object in the virtual space being included in the field of view of the virtual camera when an operation input for changing a operation target is received, and performing processing relevant to the specified object as the predetermined processing.

5. The information processing system according to the claim 1, wherein the one or more processors are further configured to execute controlling the posture of the virtual camera in the virtual space based on a posture of the goggle device.

6. The information processing system according to the claim 5, wherein the virtual camera is located at a first specific position in the virtual space.

7. The information processing system according to the claim 6, wherein the object is located at a second specific position in the virtual space.

8. The information processing system according to the claim 5, wherein the one or more processors are further configured to execute changing a direction in a horizontal direction of the virtual camera to a reference direction based on a further predetermined operation input different from the predetermined operation input.

9. An information processing system comprising a wearable goggle assembly, the wearable goggle assembly including an inertia sensor, a display, a hardware operation portion and one or more processors, wherein the one or more processors are configured to, while the wearable goggle assembly is worn, execute:

displaying, on the display, an image of a virtual space included in a field of view of a virtual camera, the virtual space including an object for invoking predetermined processing, wherein the object is a character object, and the predetermined processing comprises processsing replating to control of the character object;

acquiring movement data based on an output of the inertia sensor and operation data based on an operation input to the operation portion;

controlling posture of the virtual camera in the virtual space based on the movement data to provide images for display on the display of different portions of the virtual space;

detecting predetermined operation data corresponding to a predetermined operation input to the operation portion;

based on identifying that the object is included in a field of view of the virtual camera when the predetermined operation data is detected, performing the predetermined processing; and based on identifying that the object is not included in the field of view of the virtual camera when the predetermined operation input to the operation portion is provided, not performing the predetermined processing.

10. The information processing system according to the claim 1, wherein the one or more processors are further configured to execute generating a stereoscopic image based on the virtual camera.

11. A non-transitory computer-readable storage medium having stored therein an information processing program executable by one or more processors of an information processing apparatus comprising a wearable goggle assembly, the wearable goggle assembly including an inertia sensor, a display, and a hardware operation portion, wherein the information processing program causes the one or more processors to execute:

displaying, on the display, an image of a virtual space included in a field of view of a virtual camera, the virtual space including an object for invoking predetermined processing, wherein the predetermined processing comprises transitioning to a scene related to the object;

acquiring movement data based on an output of the inertia sensor and operation data based on an operation input to the operation portion;

controlling posture of the virtual camera in the virtual space based on the movement data to provide images for display on the display of different portions of the virtual space;

detecting predetermined operation data corresponding to a predetermined operation input to the operation portion;

based on identifying that the object is included in a field of view of the virtual camera when the predetermined operation data is detected, performing the predetermined processing; and based on identifying that the object is not included in the field of view of the virtual camera when the predetermined operation input to the operation portion is provided, not performing the predetermined processing.

12. An information processing method, comprising:

displaying, on a display of a wearable goggle assembly, an image of a virtual space included in a field of view of a virtual camera, the virtual space including an object for invoking predetermined processing, wherein the predetermined processing comprises transitioning to a scene related to the object;

acquiring movement data based on an output of an inertia sensor of the wearable goggle assembly and operation data based on an operation input to a hardware operation portion of the wearable goggle assembly;

controlling posture of the virtual camera in the virtual space based on the movement data to provide images for display on the display of different portions of the virtual space;

detecting predetermined operation data corresponding to a predetermined operation input to the operation portion;

based on identifying that the object is included in a field of view of the virtual camera when the predetermined operation data is detected, performing the predetermined processing; and based on identifying that the object is not included in the field of view of the virtual camera when the predetermined operation input to the operation portion is provided, not performing the predetermined processing.

13. A non-transitory computer-readable storage medium having stored therein an information processing program executable by one or more processors of an information processing apparatus comprising a wearable goggle assembly, the wearable goggle assembly including an inertia sensor, a display, and a hardware operation portion, wherein the information processing program causes the one or more processors to execute:

displaying, on the display, an image of a virtual space included in a field of view of a virtual camera, the virtual space including an object for invoking predetermined processing, wherein the object is a character object and the predetermined processing comprises processing relating to control of the character object;

acquiring movement data based on an output of the inertia sensor and operation data based on an operation input to the operation portion;

controlling posture of the virtual camera in the virtual space based on the movement data to provide images for display on the display of different portions of the virtual space;

detecting predetermined operation data corresponding to a predetermined operation input to the operation portion;

based on identifying that the object is included in a field of view of the virtual camera when the predetermined operation data is detected, performing the predetermined processing; and based on identifying that the object is not included in the field of view of the virtual camera when the predetermined operation input to the operation portion is provided, not performing the predetermined processing.

14. An information processing method, comprising:

displaying, on a display of a wearable goggle assembly, an image of a virtual space included in a field of view of a virtual camera, the virtual space including an object for invoking predetermined processing, wherein the object is a character object and the predetermined processing comprises processing relating to control of the character object;

acquiring movement data based on an output of an inertia sensor of the wearable goggle assembly and operation data based on an operation input to a hardware operation portion of the wearable goggle assembly;

controlling posture of the virtual camera in the virtual space based on the movement data to provide images for display on the display of different portions of the virtual space;

detecting predetermined operation data corresponding to a predetermined operation input to the operation portion;

based on identifying that the object is included in a field of view of the virtual camera when the predetermined operation data is detected, performing the predetermined processing; and based on identifying that the object is not included in the field of view of the virtual camera when the predetermined operation input to the operation portion is provided, not performing the predetermined processing.

\* \* \* \* \*